(12) United States Patent
Kim et al.

(10) Patent No.: US 10,674,469 B2
(45) Date of Patent: Jun. 2, 2020

(54) METHOD FOR PERFORMING SERVICE REQUEST PROCEDURE AND APPARATUS THEREFOR IN WIRELESS COMMUNICATION SYSTEM

(71) Applicant: LG ELECTRONICS INC., Seoul (KR)

(72) Inventors: Taehun Kim, Seoul (KR); Laeyoung Kim, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/016,245

(22) Filed: Jun. 22, 2018

(65) Prior Publication Data

US 2018/0376444 A1 Dec. 27, 2018

Related U.S. Application Data

(60) Provisional application No. 62/522,702, filed on Jun. 21, 2017, provisional application No. 62/528,987, filed on Jul. 6, 2017.

(51) Int. Cl.
*H04W 76/30* (2018.01)
*H04W 60/04* (2009.01)
(Continued)

(52) U.S. Cl.
CPC .............. *H04W 60/04* (2013.01); *H04W 4/70* (2018.02); *H04W 36/0022* (2013.01);
(Continued)

(58) Field of Classification Search
None
See application file for complete search history.

(56) References Cited

U.S. PATENT DOCUMENTS

2018/0192471 A1* 7/2018 Li ...................... H04W 72/0493
2018/0199398 A1* 7/2018 Dao ....................... H04W 36/14

FOREIGN PATENT DOCUMENTS

| KR | 1020040017406 A | 2/2004 |
| KR | 100959719 B1 | 5/2010 |
| KR | 1020110051174 A | 5/2011 |

OTHER PUBLICATIONS

3GPP TR 24.890 V0.2.0 (May 2017), 3rd Generation Partnership Project; Technical Specification Group Core Network and Terminals; 5G System—Phase 1; CT WG1 Aspects (Release 15), 70 pages.
(Continued)

*Primary Examiner* — Phuongchau Ba Nguyen
(74) *Attorney, Agent, or Firm* — Fish & Richardson P.C.

(57) ABSTRACT

In an aspect of the present invention, a method for performing a service request message of an Access and Mobility Management Function (AMF) in a wireless communication system may include a packet data unit (PDU) session identifier (ID) for a PDU session whose activation is desired by a user equipment from the user equipment; transmitting a first message comprising the PDU session ID to a session management function (SMF); when an establishment of the PDU session is rejected by the SMF: receiving a second message comprising a reject cause of the PDU session establishment as a response to the first message; and transmitting a service response message comprising the reject cause and a PDU session ID rejected by the reject cause to the user equipment.

14 Claims, 16 Drawing Sheets

(51) Int. Cl.
*H04W 68/02* (2009.01)
*H04W 76/27* (2018.01)
*H04W 36/00* (2009.01)
*H04W 4/70* (2018.01)
*H04W 74/08* (2009.01)
*H04W 76/12* (2018.01)
*H04W 76/18* (2018.01)
*H04W 84/04* (2009.01)
*H04W 60/06* (2009.01)
*H04W 4/90* (2018.01)
*H04W 4/14* (2009.01)

(52) U.S. Cl.
CPC ....... *H04W 68/02* (2013.01); *H04W 74/0833* (2013.01); *H04W 76/12* (2018.02); *H04W 76/18* (2018.02); *H04W 76/27* (2018.02); *H04W 76/30* (2018.02); *H04W 4/14* (2013.01); *H04W 4/90* (2018.02); *H04W 60/06* (2013.01); *H04W 84/042* (2013.01)

(56) References Cited

OTHER PUBLICATIONS

3GPP TS 23.502 V0.4.0 (May 2017), 3rd Generation Partnership Project; Technical Specification Group Services and System Aspects; Procedures for the 5G System; Stage 2 (Release 15), 126 pages.
3GPP TS 23.501 V1.0.0 (Jun. 2017), 3rd Generation Partnership Project; Technical Specification Group Services and System Aspects; System Architecture for the 5G System; Stage 2 (Release 15), 146 pages.
Translation of Notice of Allowance for Korean Application No. 10-2018-0071632, dated Sep. 6, 2018, 1 page.
"3rd Generation Partnership Project; Technical Specification Group Core Network and Terminals; 5G System—Phase 1; CT WG1 Aspects (Release 15)," 3GPP TR 24.890 V0.2.0, dated May 2017, 70 pages.
"3rd Generation Partnership Project; Technical Specification Group Services and System Aspects; System Architecture for the 5G System; Stage 2 (Release 15)," 3GPP TS 23.501 V1.0.0, dated Jun. 2017, 145 pages.
"3rd Generation Partnership Project; Technical Specification Group Services and System Aspects; Procedures for the 5G System; Stage 2 (Release 15)," 3GPP TS 23.502 V0.4.0, dated May 2017, 124 pages.
LG Electronics, "TS 23.502: Clarification on Service Request procedures," S2-174431, SA WG2 Meeting #122, San Jose del Cabo, Mexico, Jun. 26-30, 2017, 13 pages.
Huawei, Hisilicon, "Pseudo CR on TS 23.502 for updating service request procedures with NF service operation invocations," S2-174162, SA WG2 Meeting #122, San Jose Del Cabo, Mexico, Jun. 26-30, 2017, 19 pages.
3rd Generation Partnership Project; Technical Specification Group Services and System Aspects; "Procedures for the 5G System; Stage 2 (Release 15)," 3GPP TS 23.502 V0.4.0, dated May 2017, 126 pages, XP 051298344.
Ericsson, "Description of SM information and PDU Session ID on N11 and N1," S2-173005, SA WG2 Meeting #121, Hangzhou, China, dated May 15-19, 2017, 27 pages.
Extended European Search Report in European Application No. 18820176.8, dated Dec. 6, 2019, 11 pages.
LG Electronics Inc., "TS 23.502: UE triggered PDU Session Activation procedure in connected mode," S2-170851, SA WG2 Meeting #119, Dubrovnik, Croatia, dated Feb. 13-17, 2017, 6 pages.
LG electronics, "TS 23.502: Update of session establishment procedure for LBO—Including fallback from LBO to home-routed," S2-172117, SA WG2 Meeting #120, Busan, South Korea, dated Mar. 27-31, 2017, 8 pages.
Samsung, "TS 23.502: Updates to UE Triggered Service Request Procedure," S2-171984, SA WG2 Meeting #120, Busan, S. Korea, dated Mar. 27-31, 2017, 4 pages.
ZTE, "23.502 P-CR: Clarification on PDU session ID in the service request message," S2-174687, SA WG2 Meeting #122, San Jose Del Cabo, Mexico, dated Jun. 26-30, 2017, 11 pages.
PCT International Search Report and Written Opinion in International Application No. PCT/KR2018/007035, dated Oct. 15, 2018, 5 pages (with English translation).

\* cited by examiner (a) Control Plane Protocol Stack (b) User Plane Protocol Stack (a) control-plane protocol stack (b) user-plane protocol stack (a)

(b)

(a)

(b)

METHOD FOR PERFORMING SERVICE REQUEST PROCEDURE AND APPARATUS THEREFOR IN WIRELESS COMMUNICATION SYSTEM

CROSS-REFERENCE TO RELATED APPLICATIONS

This application claims the benefit of U.S. Provisional Application No. 62/522,702 filed on Jun. 21, 2017 and No. 62/528,987 filed on Jul. 6, 2017. The contents of this application are hereby incorporated by reference in its entirety.

BACKGROUND OF THE INVENTION

Field of the Invention

The present invention relates to wireless communication and, more particularly, to a method for performing/supporting User Equipment triggered service request procedure and an apparatus for the same.

Related Art

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

Particularly, for the device in which power consumption significantly influences on the life of the device, various techniques for decreasing the power consumption has been vigorously developed.

SUMMARY OF THE INVENTION

An object of the present invention is to solve various problems that may occur according to procedure ambiguity by defining a service request procedure of a wireless communication system more clearly.

The present invention proposes the embodiments for a method and apparatus for solving the technical problems. The technical problems to solve in the present invention is not limited to the technical problems mentioned above, but can be clearly understood by those ordinary skilled in the art to which the present invention is pertained from the description below.

In an aspect of the present invention, a method for performing a service request message of an Access and Mobility Management Function (AMF) in a wireless communication system may include a packet data unit (PDU) session identifier (ID) for a PDU session whose activation is desired by a user equipment from the user equipment; transmitting a first message comprising the PDU session ID to a session management function (SMF); when an establishment of the PDU session is rejected by the SMF: receiving a second message comprising a reject cause of the PDU session establishment as a response to the first message; and transmitting a service response message comprising the reject cause and a PDU session ID rejected by the reject cause to the user equipment.

In addition, the method for performing a service request message may include: receiving a third message comprising N2 SM information including information to be provided from the AMF to an access network (AN) as a response to the first message; and transmitting the N2 SM information to the AN when the establishment of the PDU session is accepted by the SMF.

In addition, the transmitting the N2 SM information to the AN may include, when a plurality of PDU session IDs involving a plurality of SMFs is included in the service request message, transmitting N2 SM information received from at least some of the plurality of SMFs to the AN through an N2 request message without waiting for a reception of N2 SM information from all of the plurality of SMFs.

In addition, the transmitting the N2 SM information to the AN may include, transmitting additional N2 SM information to the AN through a separate N2 message when the additional N2 SM information is received from remaining SMFs except the at least some of the plurality of SMFs.

In addition, the separate N2 message may correspond to an N2 tunnel setup request message.

In addition, the AN may be a network node performing a radio resource control (RRC) connection reconfiguration for the user equipment based on the N2 SM information.

In addition, the service response message may be transmitted after the second message and/or the third message is received from all of the plurality of SMFs when the plurality of PDU session IDs involving the plurality of SMFs is included in the service request message.

In addition, the service response message may include an accept result of a PDU session establishment for all of the plurality of PDU session IDs.

In addition, the service response message may correspond to a service accept message.

In another aspect of the present invention, an Access and Mobility Management Function (AMF) for performing a service request procedure in a wireless communication system may include a communication module configured to transmit and receive signals; and a processor configured to control the communication module, the processor is configured to: receive a service request message comprising a packet data unit (PDU) session identifier (ID) for a PDU session whose activation is desired by a user equipment from the user equipment, transmit a first message comprising the PDU session ID to a session management function (SMF), when an establishment of the PDU session is rejected by the SMF: receive a second message comprising a reject cause of the PDU session establishment as a response to the first message, and transmit a service response message comprising the reject cause and a PDU session ID rejected by the reject cause to the user equipment.

In addition, the processor may be configured to: when the establishment of the PDU session is accepted by the SMF, receive a third message comprising N2 SM information including information to be provided from the AMF to an access network (AN) as a response to the first message, and transmit the N2 SM information to the AN.

In addition, when the N2 SM information is transmitted to the AN, the processor may be configured to: when a plurality of PDU session IDs involving a plurality of SMFs is included in the service request message, transmit N2 SM information received from at least some of the plurality of SMFs to the AN through an N2 request message without waiting for a reception of N2 SM information from all of the plurality of SMFs.

In addition, the processor may be configured to transmit additional N2 SM information to the AN through a separate N2 message when the additional N2 SM information is received from remaining SMFs except the at least some of the plurality of SMFs.

In addition, the separate N2 message may correspond to an N2 tunnel setup request message.

In addition, the AN may be a network node performing a radio resource control (RRC) connection reconfiguration for the user equipment based on the N2 SM information.

According to an embodiment of the present invention, a service request procedure is more clearly defined, and accordingly, various problems that may occur according to ambiguity.

In addition, according to an embodiment of the present invention, an accept/reject for a PDU session establishment and/or a reject cause is clearly instructed to an AMF, and accordingly, there is an effect that procedural ambiguity and operational ambiguity of the AMF may be settled.

The Effects which may be obtained by the present invention are not limited to the aforementioned effects, and other technical effects not described above may be evidently understood by a person having ordinary skill in the art to which the present invention pertains from the following description.

BRIEF DESCRIPTION OF THE DRAWINGS

The accompanying drawings, which are included to provide a further understanding of the invention as a part of detailed descriptions, illustrate embodiment(s) of the invention and together with the descriptions, serve to explain the technical principles of the invention.

DESCRIPTION OF EXEMPLARY EMBODIMENTS

Figure 1:
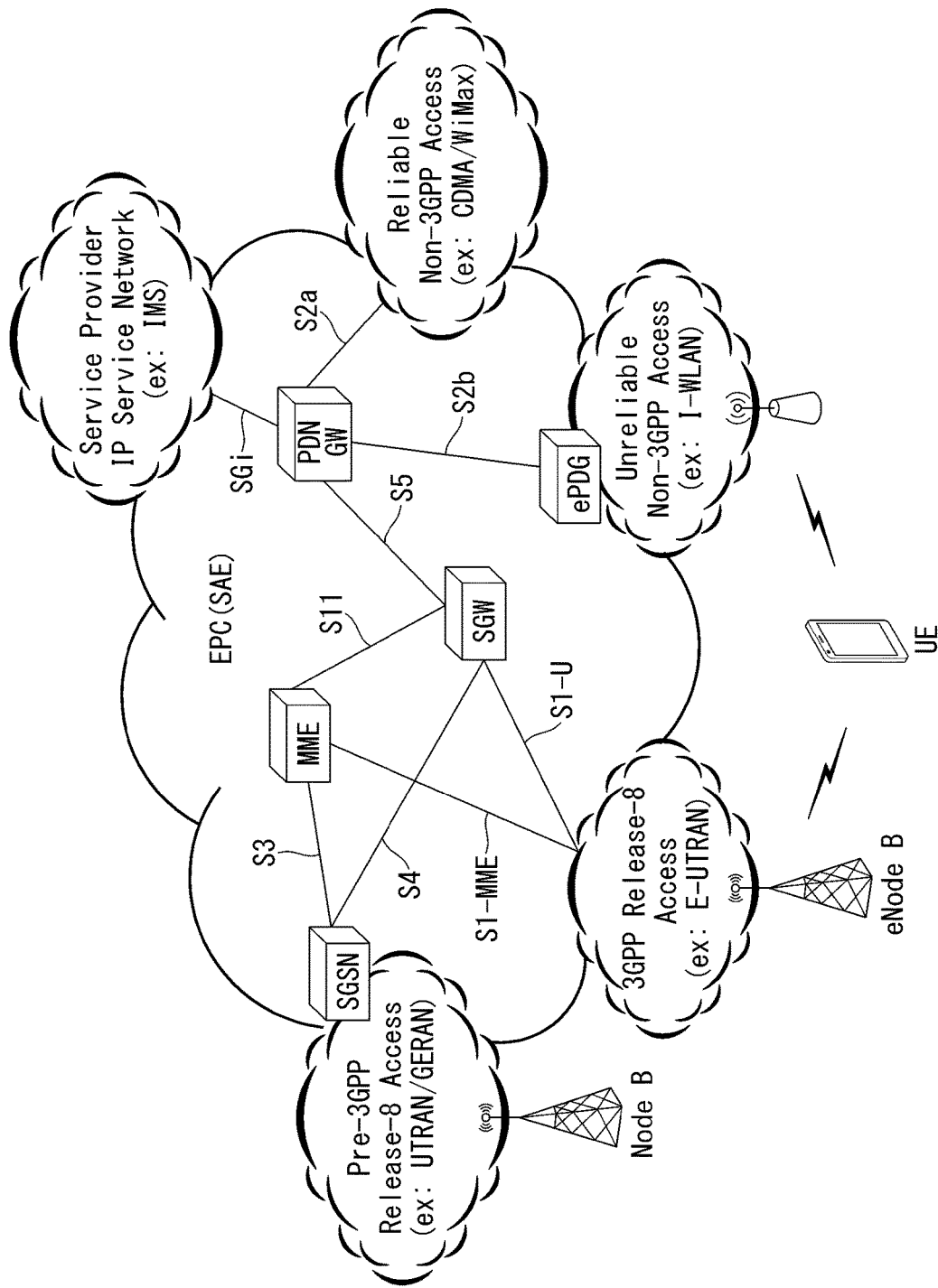
FIG. 1 illustrates an Evolved Packet System (EPS) to which the present invention can be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

Home NodeB: It is installed indoors as a based station, and the coverage is a micro cell scale.

Home eNodeB: It is installed indoors as a base station of the EPS network, and the coverage is a micro cell scale.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

MME (Mobility Management Entity): A network node in an EPS network, which performs mobility management and session management functions PDN-GW (Packet Data Network Gateway): A network node in the EPS network, which performs UE IP address allocation, packet screening and filtering, and charging data collection functions.

Serving GW (Serving Gateway): A network node in the EPS network, which performs functions such as mobility anchor, packet routing, idle mode packet buffering, and triggering paging for the ME of MME Policy and Charging Rule Function (PCRF): A node in the EPS network, which performs policy decision to dynamically apply differentiated QoS and billing policies for each service flow Open Mobile Alliance Device Management (OMA DM): A protocol designed to manage mobile devices such as mobile phones, PDAs, and portable computers, which performs such functions as device configuration, firmware upgrade, and error report Operation Administration and Maintenance (OAM): A network management function group which provides network fault indication, performance information, and data and diagnostic functions NAS configuration MO (Management Object): A Management Object (MO) used to configure the UE with the parameters associated with the NAS functionality.

PDN (Packet Data Network): A network in which a server supporting a specific service (e.g., MMS server, WAP server, etc.) is located.

PDN connection: A connection from the UE to the PDN, that is, the association (connection) between the UE represented by the IP address and the PDN represented by the APN.

APN (Access Point Name): A string that refers to or identifies the PDN. It is a name (string) (e.g., internet.mnc012.mcc345.gprs) predefined in the network when the P-GW is accessed to access the requested service or network (PDN).

Home Location Register (HLR)/Home Subscriber Server (HSS): A database (DB) that represents subscriber information in the 3GPP network.

NAS (Non-Access-Stratum): The upper stratum of the control plane between the UE and the MME. It supports mobility management, session management and IP address maintenance between the UE and the network.

AS (Access-Stratum): It includes the protocol stack between the UE and the radio (or access) network and is responsible for transmitting data and network control signals.

In what follows, the present invention will be described based on the terms defined above.

Overview of system to which the present invention can be applied

A System Overview to which the Present Invention is Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the FP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |

TABLE 1-continued

| Reference point | Description |
| --- | --- |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
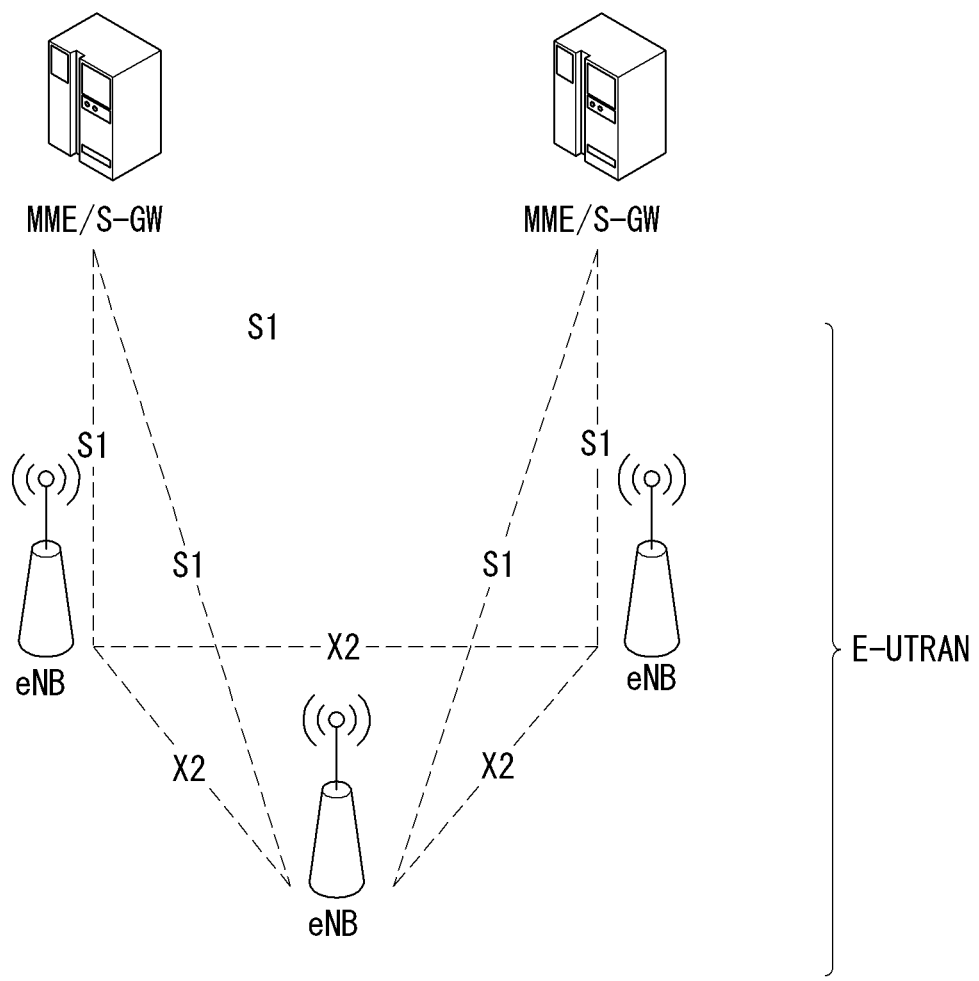
FIG. 2 illustrates one example of an Evolved Universal Terrestrial Radio Access Network (E-UTRAN) to which the present invention can be applied.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMES are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

Figure 3:
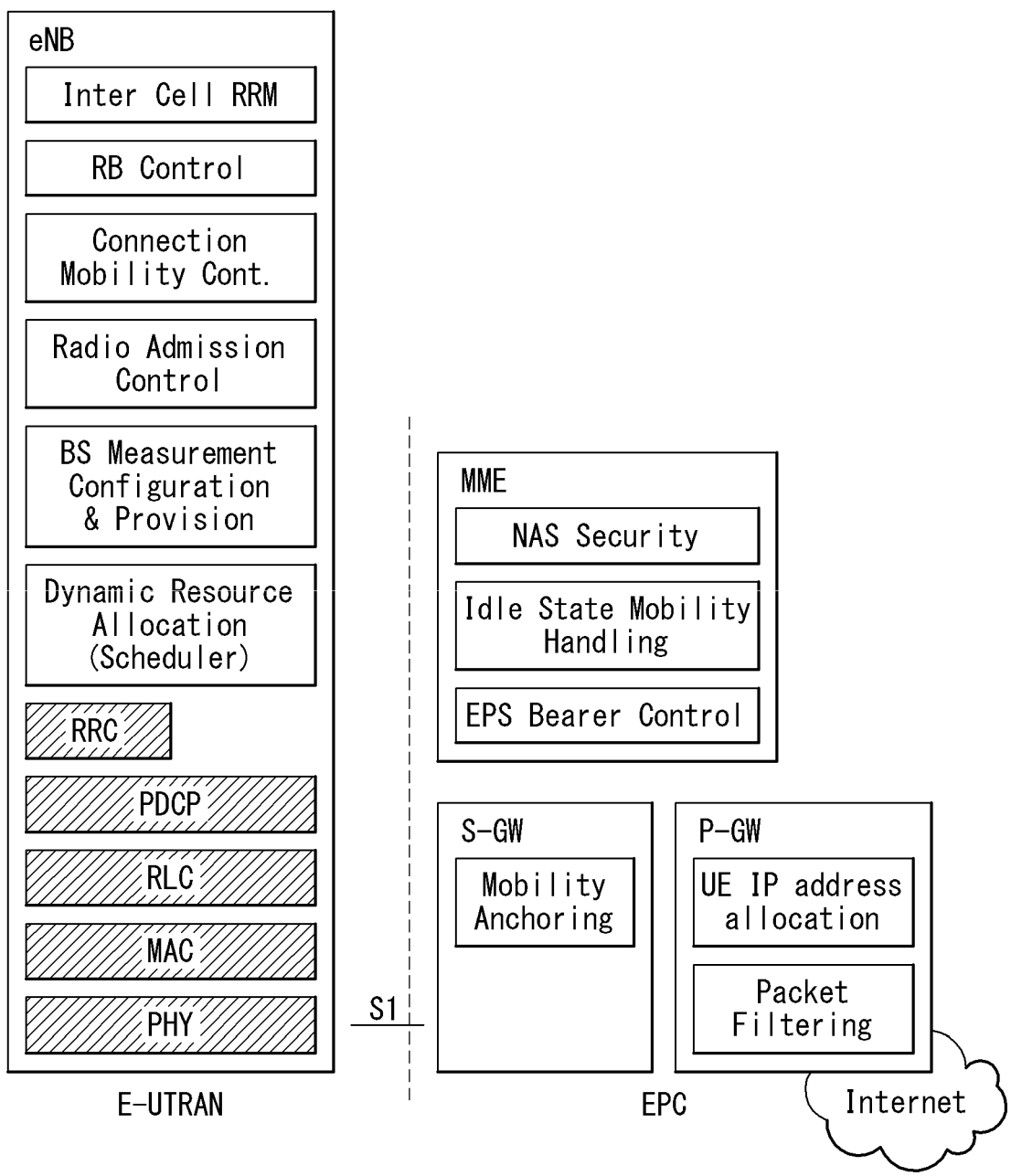
FIG. 3 illustrates structures of an E-UTRAN and an EPC in a wireless communication system to which the present invention may be applied.

FIG. 3 illustrates structures of an E-UTRAN and an EPC in a wireless communication system to which the present invention may be applied.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

Figure 4:
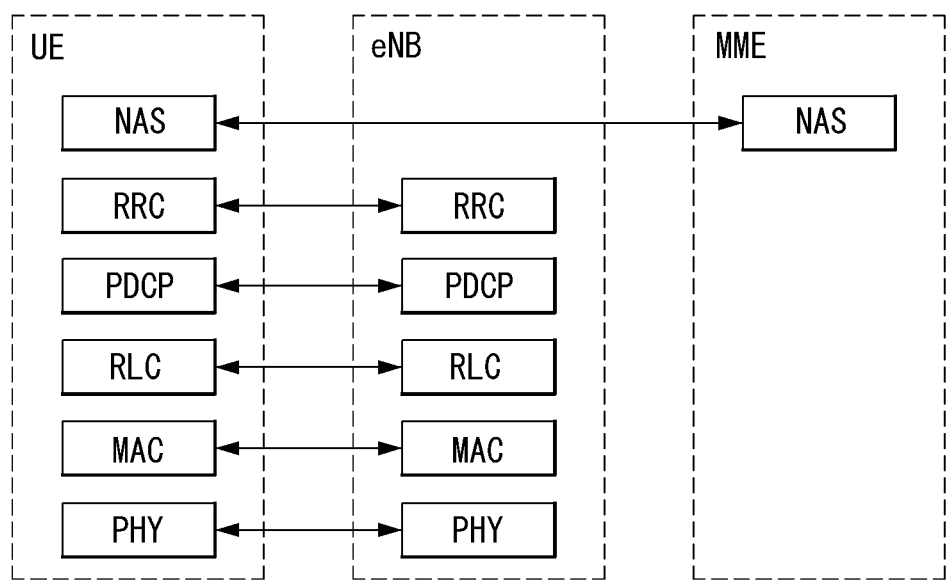
FIG. 4 illustrates a radio interface protocol structure between a UE and an E-UTRAN in a wireless communication system to which the present invention may be applied.
Figure 4:
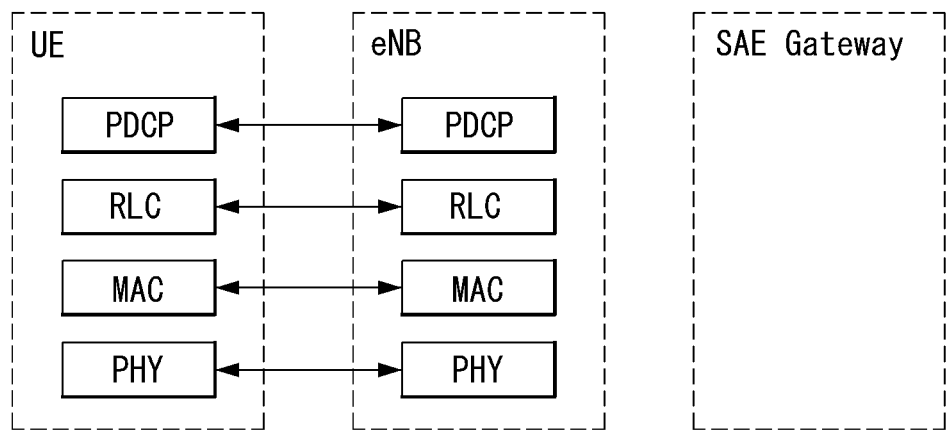

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

Figure 5:
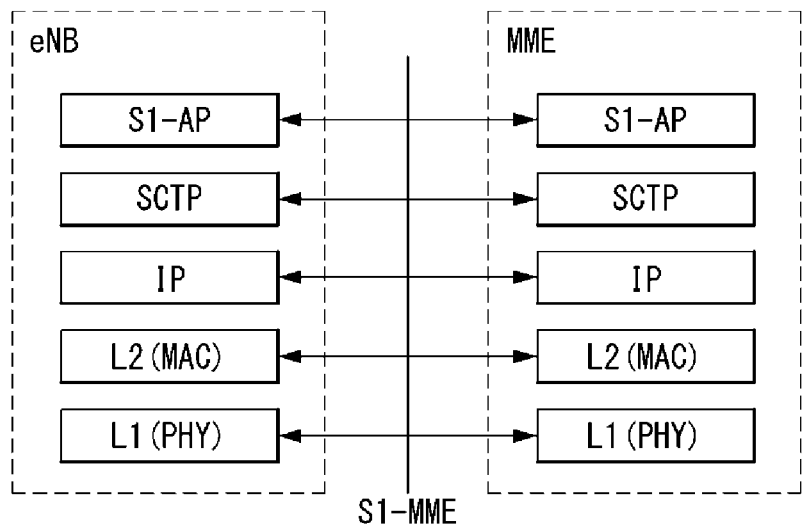
FIG. 5 illustrates an S1 interface protocol structure in a wireless communication system to which the present invention may be applied.
Figure 5:
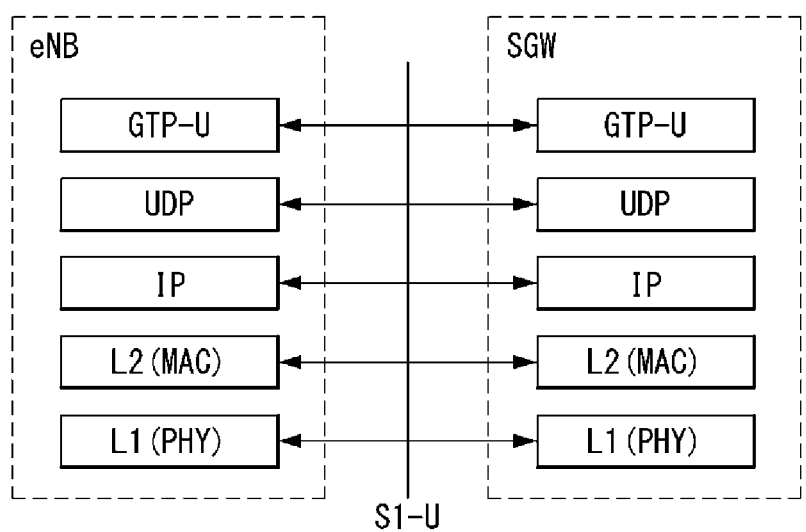

FIG. 5 illustrates an S1 interface protocol structure in a wireless communication system to which the present invention can be applied.

FIG. 5(a) illustrates the control plane protocol stack in the S1 interface, and FIG. 5(b) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

Figure 6:
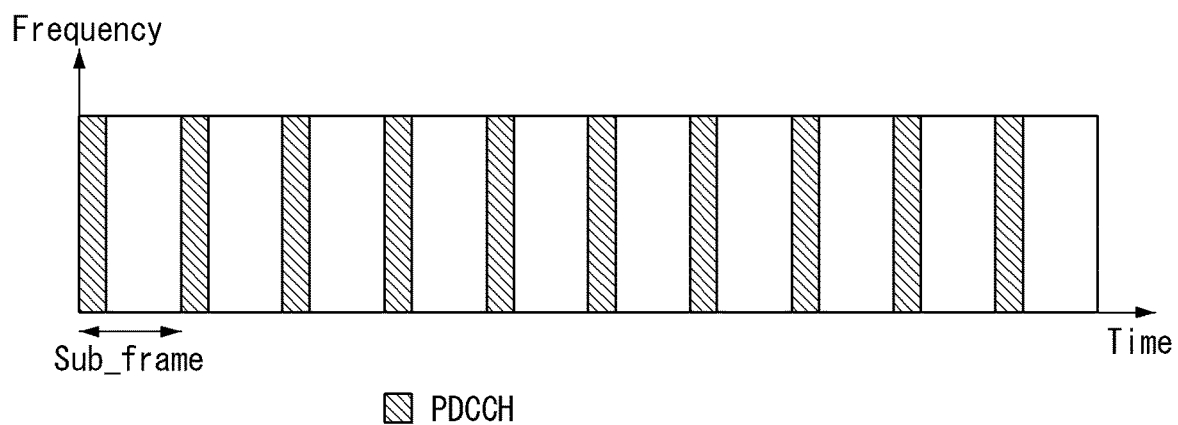
FIG. 6 illustrates a physical channel structure in a wireless communication system to which the present invention may be applied.

FIG. 6 illustrates a physical channel structure in a wireless communication system to which the present invention may be applied.

Referring to FIG. 6, a physical channel delivers signaling and data by using a radio resource comprising one or more subcarriers in the frequency domain and one or more symbols in the time domain.

One subframe having a length of 1.0 ms comprises a plurality of symbols. A specific symbol(s) of a subframe (for example, a first symbol of a subframe) may be used for a PDCCH. The PDCCH carries information about dynamically allocated resources (for example, resource block and MCS (Modulation and Coding Scheme)).

EMM and ECM State

In what follows, EPS Mobility Management (EMM) and EPS Connection Management (ECM) states will be described.

Figure 7:
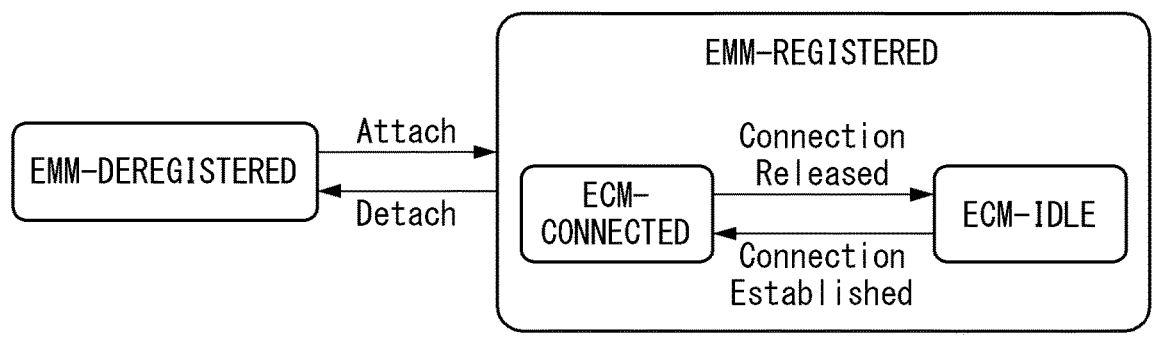
FIG. 7 illustrates an EMM and ECM states in a wireless communication system to which the present invention may be applied.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

In addition, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the location of the UE differs from the location recognized by the network while the UE is in the ECM-IDLE state, the UE can inform the network of the corresponding location of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding LIE, the UE and the MME make a transition to the ECM-CONNECTED state through a Service Request procedure.

Random Access Procedure

In what follows, a random access procedure provided by the LTE/LTE-A system will be described.

A UE employs the random access procedure to obtain uplink synchronization with an eNB or to have uplink radio resources. After being powered up, the UE acquires downlink synchronization with an initial cell and receives system information. From the system information, the UE obtains a set of available random access preambles and information about a radio resource used for transmission of a random access preamble. The radio resource used for transmission of a random access preamble may be specified by a combination of at least one or more subframe indices and indices on the frequency domain. The UE transmits a random access preamble selected in a random fashion from the set of random access preambles, and the eNB receiving the random access preamble transmits a TA (Timing Alignment) value for uplink synchronization through a random access response. By using the procedure above, the UE obtains uplink synchronization.

The random access procedure is common to FDD (Frequency Division Duplex) and TDD (Time Division Duplex) scheme. The random access procedure is independent of a cell size and is also independent of the number of serving cells in case CA (Carrier Aggregation) is configured.

First, a UE performs the random access procedure in the following cases.

- The case in which a UE performs initial access in an RRC idle state in the absence of an RRC connection to an eNB
- The case in which a UE performs an RRC connection re-establishment procedure
- The case in which a UE connects to a target cell for the first time while performing a handover procedure
- The case in which a random access procedure is requested by a command from an eNB
- The case in which downlink data are generated while uplink synchronization is not met in the RRC connected state
- The case in which uplink data are generated while uplink synchronization is not met in the RRC connected state or a designated radio resource used for requesting a radio resource is not allocated
- The case in which positioning of a UE is performed while timing advance is needed in the RRC connected state
- The case in which a recovery process is performed at the time of a radio link failure or handover failure The 3GPP Rel-10 specification takes into account applying a TA (Timing Advance) value applicable to one specific cell (for example, P cell) commonly to a plurality of cells in a wireless access system. However, a UE may combine a plurality of cells belonging to different frequency bands (namely separated with a large distance in the frequency domain) or a plurality of cells having different propagation characteristics. Also, in the case of a specific cell, if the UE performs communication with the eNB (namely macro eNB) through one cell and performs communication with the SeNB through other cell while a small cell such as an RRH (Remote Radio Header) (namely repeater), femto-cell, or pico-cell or a secondary eNB (SeNB) is disposed within the cell for coverage expansion or removal of a coverage hole, a plurality of cells may have different propagation delays. In this case, when the UE performs uplink transmission so that one TA value is applied commonly to a plurality of cells, synchronization of uplink signals transmitted among the plurality of cells may be seriously influenced. Therefore, it may be preferable to have multiple TA values under the CA mode in which a plurality of cells are aggregated. The 3GPP Rel-11 specification takes into account allocating a TA value separately for each specific cell group to support multiple TA values. This is called a TA group (TAG); a TAG may have one or more cells, and the same TA value may be applied commonly to one or more cells belonging to the TAG. To support the multiple TA values, a MAC TA command control element is composed of a 2-bit TAG Identity (ID) and a 6-bit TA command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, can be applied to all the cells within the pTAG. Meanwhile, in case of TAG (that is, secondary TAG (sTAG)) that is configured with SCells only, the TA, which is determined based on a specific SCell within sTAG, can be applied to all the cells within the corresponding sTAG, and in this time, the TA may be acquired through the random access procedure by being initiated by the eNB. Particularly, the SCell in the sTAG is set to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access can be applied to all the cells in the corresponding sTAG by the UE. Like this, the random access procedure may be performed in SCell as well in order to acquire timing alignment of the sTAG to which the corresponding SCell belongs.

In a process of selecting a random access preamble (RACH preamble), the LTE/LTE-A system supports both of a contention based random access procedure and a non-contention based random access procedure. In the former procedure, a UE selects one arbitrary preamble from a specific set, while, in the latter procedure, the UE uses the random access preamble that an eNB has allocated only to the specific UE. It should be noted, however, that the non-contention based random access procedure may be confined to the handover process described above, a case requested by a command from the eNB, and UE positioning and/or timing advance alignment for sTAG. After the random access procedure is completed, a normal uplink/downlink transmission occurs.

Meanwhile, a relay node (RN) also support both of the contention based random access procedure and the non-contention based random access procedure. When a relay node performs the random access procedure, RN subframe configuration is suspended. That is, this means that the RN subframe configuration is temporarily discarded. Thereafter, the RN subframe structure is resumed at the time when the random access procedure is successfully completed.

Figure 8:
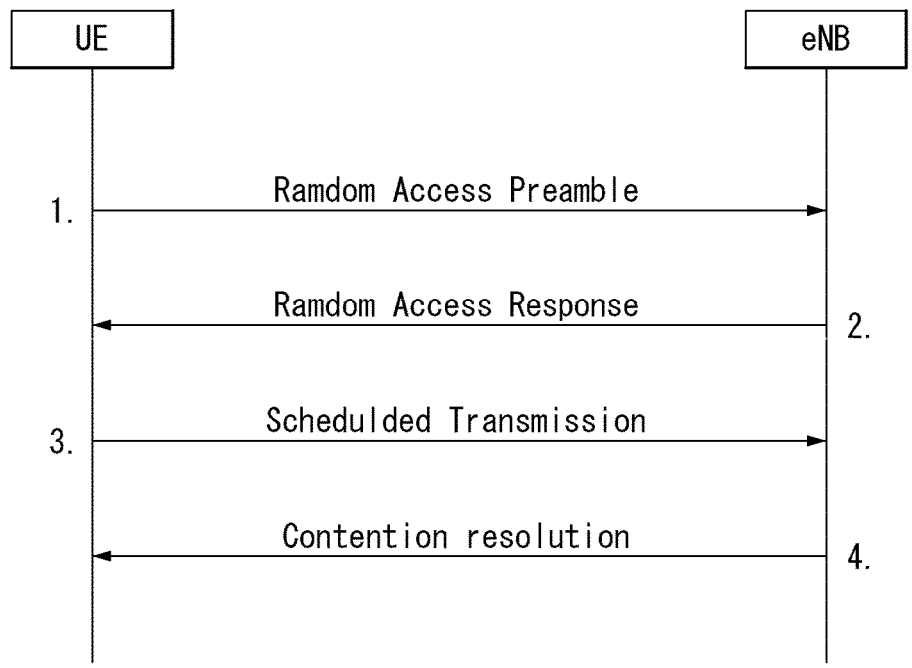
FIG. 8 illustrates a contention-based random access procedure in a wireless communication system to which the present invention may be applied.

FIG. 8 illustrates a contention-based random access procedure in a wireless communication system to which the present invention may be applied.

(1) Msg 1 (Message 1)

First, a UE selects one random access preamble (RACH preamble) randomly from a set of random access preambles indicated by system information or a handover command. The UE then selects a PRACH (Physical RACH) resource capable of transmitting the random access preamble and transmits the random access preamble by using the PRACH resource.

A random access preamble is transmitted in six bits on the RACH transmission channel, where the six bit comprises a 5-bit random identity for identifying a UE which transmits a RACH preamble and 1 bit for representing additional information (for example, indicating size of Msg 3).

An eNB which has received a random access preamble from a UE decodes the preamble and obtains RA-RNTI. A time-frequency resource of a random access preamble transmitted by the corresponding UE determines the RA-RNTI related to a PRACH to which a random access preamble is transmitted.

(2) Msg 2 (Message 2)

The eNB transmits a random access response to the UE, where the RA-RNTI obtained by using the preamble on Msg 1 addresses the random access response. A random access response may include an RA preamble index/identifier, UL grant indicating a uplink radio resource, Temporary Cell RNTI (TC-RNTI), and Time Alignment Command (TAC). A TAC indicates a time synchronization value that the eNB transmits to the UE to maintain uplink time alignment. The UE updates uplink transmission timing by using the time synchronization value. If the UE updates time synchronization, the UE initiates or restarts a time alignment timer. The UL grant includes uplink resource allocation and TPC (Transmit Power Command) used for transmitting a scheduling message (Msg 3) described later. The TPC is used to determine the transmission power for a scheduled PUSCH.

The UE attempts to receive a random access response within a random access response window indicated by the eNB through system information or a handover command, detects a PDCCH masked with an RA-RNTI corresponding to the PRACH, and receives a PDSCH indicated by the detected PDCCH. The random access response information may be transmitted in the form of a MAC PDU (MAC Packet Data Unit) and the MAC PDU may be transmit through the PDSCH. It is preferable that the PDCCH should include information of the UE that has to receive the PDSCH, frequency and time information of a radio resource of the PDSCH, and transmission format of the PDSCH. As described above, once the UE succeeds to detect the PDCCH transmitted to itself, it may properly receive a random access response transmitted to the PDSCH according to the information of the PDCCH.

The random access response window refers to a maximum time interval in which the UE transmitting a preamble waits to receive a random access response message. The random access response window has a length of 'ra-ResponseWindowSize' starting from a subframe after three subframes in the last subframe transmitting a preamble. In other words, the UE waits to receive a random access response during a random access window secured after three subframes from the subframe completed transmission of the preamble. The UE may obtain the random access window size ('ra-ResponseWindowsize') parameter through system information, and the random access window size is determined to be a value between 2 to 10.

If receiving a random access response having the same random access preamble delimiter/identity as that of the random access preamble transmitted to the eNB, the UE stops monitoring the random access response. On the other hand, if failing to receive a random access response message until a random access response window is terminated or failing to receive a valid random access response having the same random access preamble identity as that of the random access preamble transmitted to the eNB, the UE may consider reception of the random access response as having failed and then perform retransmission of the preamble.

As described above, the reason why a random access preamble identity is needed for a random access response is that one random access response may include random access response information for one or more UEs and thus it is necessary to indicate to which UE the UL grant, TC-RNTI, and TAC is valid.

(3) Msg 3 (Message 3)

Receiving a valid random access response, the UE separately processes the information included in the random access response. In other words, the UE applies the TAC and stores the TC-RNTI. Also, by using the UL grant, the UE transmits the data stored in its buffer or newly generated data to the eNB. In case the UE is connected for the first time, an RRC Connection request generated at the RRC layer and transmitted through a CCCH may be included in the Msg 3 and transmitted. And in the case of an RRC Connection Re-establishment procedure, an RRC Connection Re-establishment request generated at the RRC layer and transmitted through the CCCH may be included in the Msg 3 and transmitted. Also, a NAS connection request message may be included in the Msg 3.

The Msg 3 has to include a UE identity. In the case of a contention based random access procedure, the eNB is unable to determine which UEs perform the random access procedure. Thus, the eNB needs the UE identity for each UE to avoid potential contention.

There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (for example, S(SAE)-TMSI or a random number). In most cases, the unique identity is longer than the C-RNTI.

The UE uses UE-specific scrambling for transmission on UL-SCH. In case the UE has received a C-RNTI, the UE may perform scrambling by using the C-RNTI. In case the UE has not received a C-RNTI yet, the UE is unable to perform C-RNTI based scrambling but uses a TC-RNTI received from a random access response instead. If having received data corresponding to the UL grant, the UE initiates a contention resolution timer for resolving contention.

(4) Msg 4 (Message 4)

Receiving the C-RNTI of a UE through the Msg 3 from the corresponding UE, the eNB transmits a Msg 4 to the UE by using the receiving C-RNTI. On the other hand, in case the eNB receives the unique identity (namely S-TMSI or a random number) through the Msg 3, the eNB transmit the Msg 4 to the UE by using a TC-RNTI allocated to the corresponding UE from a random access response. As one example, the Msg 4 may include an RRC Connection Setup message.

After transmitting data including an identity through a UL grant included in the random access response, the UE waits for a command from the eNB to resolve contention. In other words, two methods are available for a method for receiving the PDCCH, too. As described above, in case the identity in the Msg 3 transmitted in response to the UL grant is the C-RNTI, the UE attempts to receive the PDCCH by using its C-RNTI. In case the identity is a unique identity (in other words, S-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data includes a unique identity of the UE, the UE determines that the random access procedure has been performed successfully and terminates the random access procedure. The UE obtains the C-RNTI through the Msg 4, after which the UE and the network transmit and receive a UE dedicated message by using the C-RNTI.

Next, a method for resolving contention during random access will be described.

The reason why contention occurs during random access is that the number of random access preambles is, in principle, finite. In other words, since the eNB is unable to assign random access preambles unique to the respective UEs, a UE selects and transmits one from among common random access preambles. Accordingly, although there are cases where two or more UEs select and transmit the same random access preamble by using the same radio resource (PRACH resource), the eNB considers the random access preamble as the one transmitted from a single UE. Thus, the eNB transmits a random access response to the UE and expects that only one UE receive the random access response. However, as described above, because of the possibility of contention, two or more UEs receive the same random access response, and each receiving UE performs an operation due to the random access response. In other words, a problem occurs where two or more UEs transmit different data to the same radio resource by using one UL grant included in the random access response. Accordingly, transmission of the data may all fail, or the eNB may succeed to receive only the data from a specific UE depending on the positions of transmission power of UEs. In the latter case, since two or more UEs assume that they all have succeeded to transmit their data, the eNB has to inform those UEs that have failed in the contention about their failure. In other words, contention resolution refers to the operation of informing a UE about whether it has succeeded or failed.

Two methods are used for contention resolution. One of the methods employs a contention resolution timer and the other method employs transmitting an identity of a successful UE to other UEs. The former case is used when a UE already has a unique C-RNTI before performing a random access process. In other words, a UE that already has a C-RNTI transmits data including its C-RNTI to the eNB according to a random access response and operates a contention resolution timer. And if the UE receives a PDCCH indicated by its C-RNTI before the contention resolution timer expires, the UE determines that it has won the contention and finishes random access normally. On the other hand, if the UE fails to receive a PDCCH indicated by its C-RNTI before the contention resolution timer expires, the UE determines that it has lost the contention and performs the random access process again or inform a upper layer of the failure. The latter contention resolution method, namely the method for transmitting an identity of a successful UE, is used when a UE does not have a unique cell identity before performing the random access process. In other words, in case the UE has no cell identity, the UE transmits data by including an upper identity (S-TMSI or a random number) higher than a cell identity in the data according to the UL grant information included in a random access response and operates a contention resolution timer. In case the data including the upper identity of the UE is transmitted to a DL-SCH before the contention resolution timer expires, the UE determines that the random access process has been performed successfully. On the other hand, in case the data including the upper identity of the UE is not transmitted to the DL-SCH before the contention resolution data expires, the UE determines that the random access process has failed.

Figure 11:
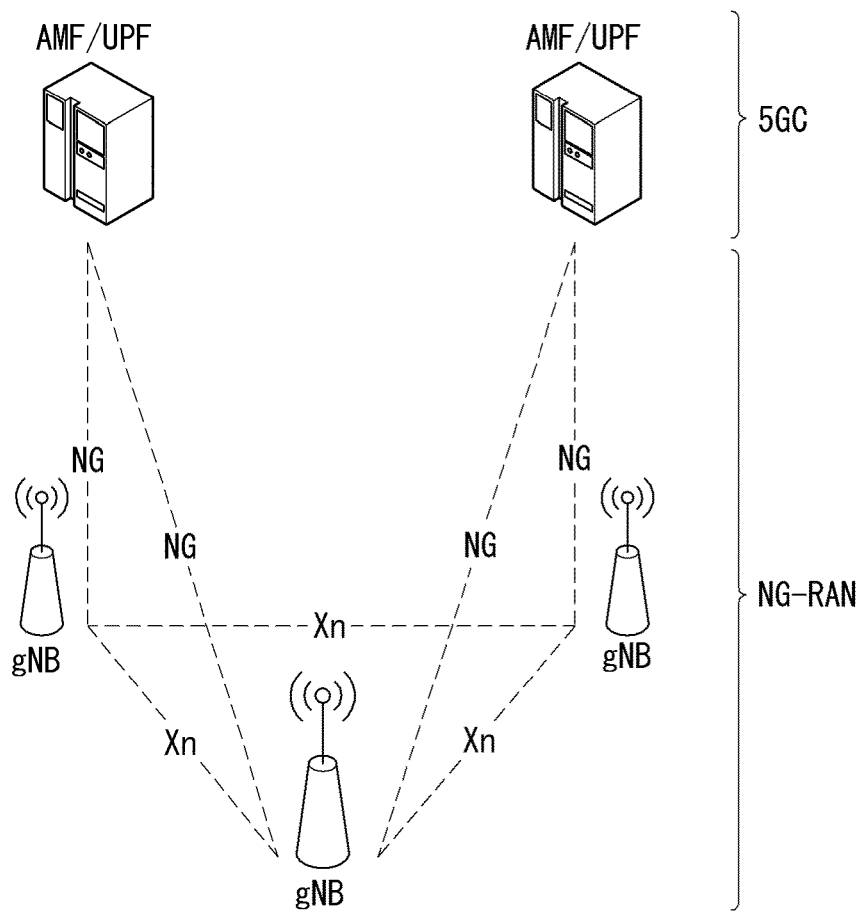
FIG. 11 illustrates an NG-RAN architecture to which the present invention may be applied.

Meanwhile, different from the contention based random access process illustrated in FIG. 11, a non-contention based random access process finishes its procedures only by transmitting the Msg 1 and 2. However, before the UE transmits a random access preamble to the eNB as the Msg 1, the eNB allocates a random access preamble to the UE. The random access procedure is terminated as the UE transmits the allocated random access preamble to the eNB as the Msg 1 and receives a random access response from the eNB.

5G System Architecture to which the Present Invention May be Applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 9): indicates an interaction between NF services within NFs described by a point-to-point reference point (e.g., N11) between two NFs (e.g., AMF and SMF).

Service-based representation (FIG. 10): network functions (e.g., AMFs) within a control plane (CP) permit other authenticated network functions to access its own service. If this representation is necessary, it also includes a point-to-point reference point.

Figure 9:
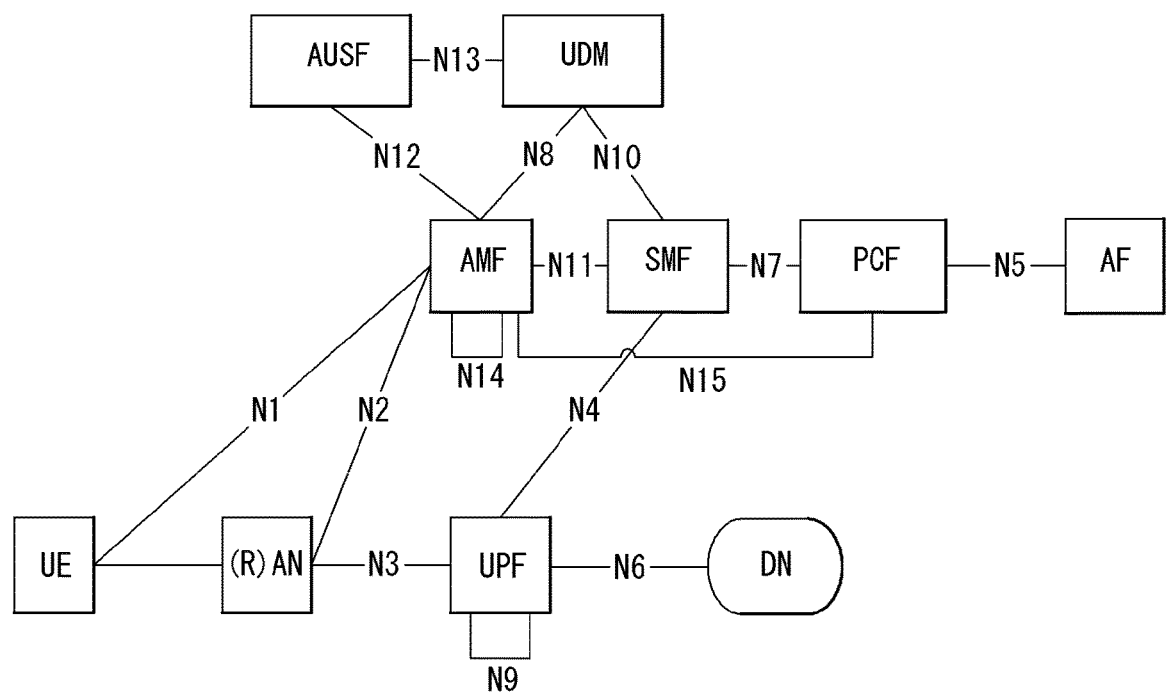
FIG. 9 illustrates a 5G system architecture using reference point representation.

FIG. 9 is a diagram illustrating 5G system architecture using a reference point representation.

Referring to FIG. 9, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF (SMS(Short Message Service) function), a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

In 5G system, the network node in charge of transmission/reception of wireless signals with the UE is the gNB, and plays the same role as the eNB.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is gNB and plays the same role as the eNB in the EPS. When the UE is simultaneously connected to the 3GPP connection and the non-3GPP connection, the UE receives a service through one AMF as illustrated in FIG. 9. In FIG. 9, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session, which can be independently activated per PDU.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

Figure 10:
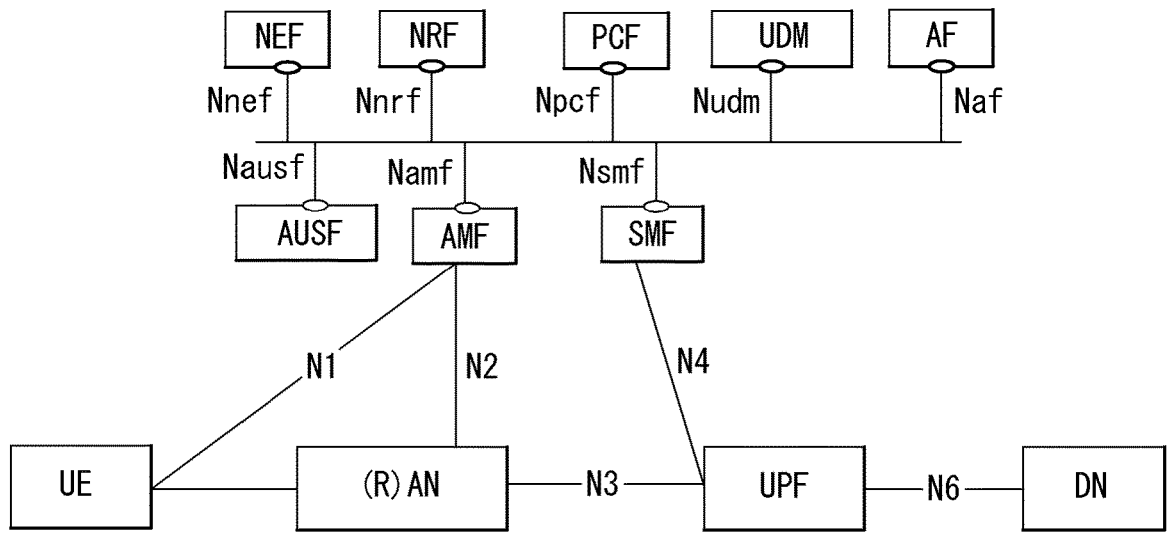
FIG. 10 illustrates a 5G system architecture using a service-based representation.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF FIG. 10 is a diagram illustrating 5G system architecture using a service-based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF
Nsmf: a service-based interface exhibited by an SMF
Nnef: a service-based interface exhibited by an NEF
Npcf: a service-based interface exhibited by a PCF
Nudm: a service-based interface exhibited by a UDM
Naf: a service-based interface exhibited by an AF
Nnrf: a service-based interface exhibited by an NRF
Nausf: a service-based interface exhibited by an AUSF NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.
A complete end-to-end message flow is described by the sequence of NF service invocation.
Two operations for NF(s) to provide their services through service-based interfaces are as follows:
i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

FIG. 11 illustrates NG-RAN architecture to which the present invention may be applied.

Referring to FIG. 11, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC. The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

Figure 12:
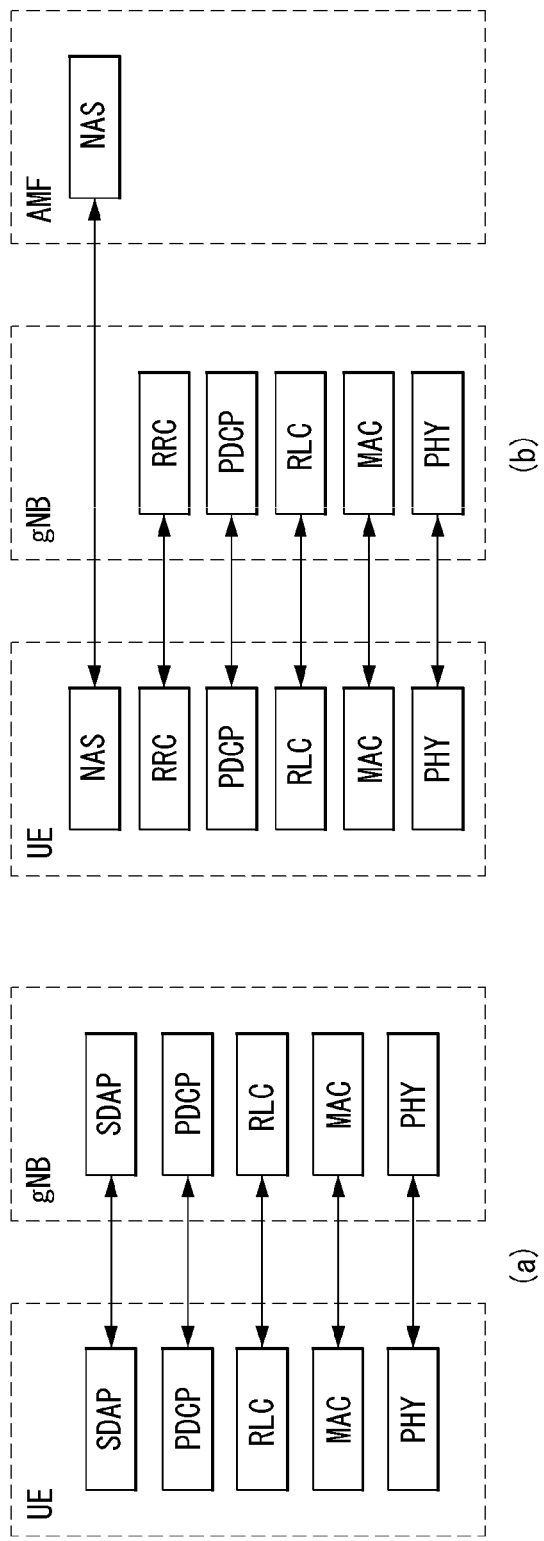
FIG. 12 illustrates a wireless protocol stack to which the present invention may be applied.

FIG. 12 is a diagram illustrating a radio protocol stack to which the present invention may be applied. Specifically, FIG. 12(a) illustrates a radio interface user plane protocol stack between a UE and a gNB, and FIG. 12(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 12(a), the user plane protocol stack may be divided into a first layer (Layer 1) (i.e., a physical layer (PHY) layer) and a second layer (Layer 2).

Referring to FIG. 12(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.
Broadcast control channel (BCCH): a downlink channel system for broadcasting control information.
Paging control channel (PCCH): a downlink channel transferring paging information and system information change notification.
Common control channel (CCCH): a channel for transmitting control information between a UE and a network. This channel is used for UEs not having an RRC connection with a network.
Dedicated control channel (DCCH): a point-to-point bidirectional channel for transmitting dedicated control information between a UE and a network. It is used by a UE having an RRC connection.

ii) The traffic channel is used to use only user plane information:
Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

Network Slicing

A 5G system has introduced a network slicing technology which provides network resources and network functions to an independent slice based on each service.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:
Core network control plane and user plane function
NG-RAN Non-3GPP interworking function (N3IWF) toward a non-3GPP access network A function supported for each network slice and network function optimization may be different. A plurality of network slice instances may provide the same function to different groups of UEs.

One UE may be connected to one or more network slice instances at the same time via a 5G-AN. One UE may be served at the same time by a maximum of 8 network slices. An AMF instance that serves a UE may belong to each network slice instance that serves the UE. That is, the AMF instance may be common to a network slice instance that serves the UE. The CN part of a network slice instance(s) that serves a UE is selected by a CN.

One PDU session belongs to only a specific one network slice instance for each PLMN. Different network slice instances do not share one PDU session.

One PDU session belongs to a specific one network slice instance for each PLMN.

Different slices may have slice-specific PDU sessions using the same DNN, but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:

Slice/service type (SST): the SST indicates the operation of a network slice expected form a viewpoint of a function and service.

Slice differentiator (SD): the SD is optional information that supplements an SST(s) for selecting a network slice instance from a plurality of potential network slice instances all of which comply with an indicated SST.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice.

When a UE is successfully registered, a CN notifies an (R)AN of all of Allowed NSSAIs (including one or more S-NSSAIs) by providing the NSSAIs. Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

2) Slice Change

A network may change an already selected network slice instance depending on a local policy and the mobility, subscription information change, etc. of a UE. That is, a set of network slices of a UE may be changed at any time while the UE is registered with a network. Furthermore, a change of a set of network slices of a UE may be initiated by a network or under specific conditions.

A network may change a set of allowed network slice(s) with which a UE has been registered based on a local policy, a subscription information change and/or the mobility of the UE. A network may perform such a change during a registration procedure or may notify a UE of a change of a supported network slice(s) using a procedure capable of triggering a registration procedure.

Upon changing the network slice, the network may provide the UE with a new Allowed NSSAI and a tracking area list. The UE includes the new NSSAI in signaling according to a mobility management procedure and transmits the signaling, thereby causing the reselection of a slice instance. An AMF supporting the slice instance may also be changed in response to a change of the slice instance.

When a UE enters an area in which a network slice is no longer available, a core network releases a PDU session for an S-NSSAI corresponding to a network slice that is no longer available through a PDU session release procedure.

When the PDU session corresponding to the slice that is no longer available is released, the UE determines whether the existing traffic can be routed through a PDU session belonging to another slice using a UE policy.

For a change of a set of used S-NSSAI(s), a UE initiates a registration procedure.

3) SMF Selection

A PCF provides a UE with a network slice selection policy (NSSP). The NSSP associates the UE with an S-NSSAI and is used by the UE in order to determine a PDU session to which traffic will be routed.

A network slice selection policy is provided for each application of a UE. This includes a rule by which an S-NSSAI can be mapped for each UE application. The AMF selects an SMF for PDU session management using subscriber information and a local operator policy along with an SM-NSSAI transferred by a UE and DNN information.

When a PDU session for a specific slice instance is established, a CN provides an (R)AN with an S-NSSAI corresponding to the slice instance to which the PDU session belongs so that an RAN can access a specific function of a slice instance.

Session Management

5GC supports a PDU connectivity service, that is, a service that provides the exchange of PDU(s) between a UE and a DN identified by a data network name (DNN) (or an access point name (APN)). The PDU connectivity service is also supported through a PDU session established upon request from the UE.

Each PDU session supports a single PDU session type. That is, when the PDU session is established, it supports the exchange of PDUs of a single type requested by a UE. The following PDU session types are defined. IP version 4 (IPv4), IP version 6 (IPv6), Ethernet, and unstructured. In this case, the type of PDUs exchanged between a UE and a DN are completely transparent in a 5G system.

A PDU session is established using NAS SM signaling exchanged between a UE and an SMF through N1 (upon UE request), modified (upon UE and 5GC request), and released (upon UE and 5GC request). Upon request from an application server, 5GC may trigger a specific application within a UE. When the UE receives a trigger message, it transfers the corresponding message to an identified application. The identified application may establish a PDU session with a specific DNN.

An SMF checks whether a UE request complies with user subscription information. To this end, the SMF obtains SMF level subscription data from UDM. Such data may indicate an accepted PDU session type for each DNN:

A UE registered through a plurality of accesses selects access for setting up a PDU session.

A UE may request to move a PDU session between 3GPP and non-3GPP access. A determination for moving the PDU session between 3GPP and non-3GPP access is made for each PDU session. That is, the UE may have a PDU session using 3GPP access while another PDU session uses non-3GPP access.

Within a PDU session setup request transmitted by a network, a UE provides a PDU session identity (ID). Furthermore, the UE may provide a PDU session type, slicing information, a DNN, service and a session continuity (SSC) mode.

A UE may establish a plurality of PDU sessions with the same DN or different DNs at the same time via 3GPP access and/or via non-3GPP access.

A UE may establish a plurality of PDU sessions with the same DN served by a different UPF end N6.

A UE having a plurality of established PDU sessions may be served by different SMFs.

The user plane path of a different PDU sessions belonging to the same UE (the same or different DNNs) may be fully separated between an UPF and AN interfacing with a DN.

5G system architecture can satisfy various continuity requirements of different application/services within a UE by supporting a session and service continuity (SCC). A 5G system supports different SSC modes. An SSC mode associated with a PDU session anchor is not changed while a PDU session is established.

In the case of a PDU session to which SSC Mode 1 is applied, a network maintains continuity service provided to a UE. In the case of a PDU session of an IP type, an IP address is maintained.

If SSC Mode 2 is used, a network may release continuity service delivered to a UE. Furthermore, the network may release a corresponding PDU session. In the case of a PDU session of an IP type, a network may release an IP address(es) allocated to a UE.

If SSC Mode 3 is used, a change of a user plane can be aware by a UE, but a network guarantees that the UE does not lose connectivity. In order to permit better service continuity, a connection through a new PDU session anchor point is established before a previous connection is terminated. In the case of a PDU session of an IP type, an IP address is not maintained while an anchor is deployed again.

An SSC mode selection policy is used to determine the type of SSC mode associated with an application (or application group) of a UE. An operator may previously configure an SSC mode selection policy in a UE. The policy includes one or more SSC mode selection policy rules which may be used for a UE to determine the type of SSC mode associated with an application (or a group of applications). Furthermore, the policy may include a default SSC mode selection policy rule which may be applied to all of applications of a UE.

If a UE provides an SSC mode when it requests a new PDU session, an SMF selects whether it will accept the requested SSC mode or whether it will modify the requested SSC mode based on subscription information and/or a local configuration. If a UE does not provide an SSC mode when it requests a new PDU session, an SMF selects a default SSC mode for data networks listed within subscription information or applies a local configuration for selecting an SSC mode.

An SMF notifies a UE of an SSC mode selected for a PDU session.

Mobility Management

Registration management (RM) is used to register or deregister a UE/user with/from a network and to establish user context within a network.

1) Registration Management

A UE/user needs to register a network in order to receive service that requests registration. Once the UE/user is registered, the UE may update its own registration with the network in order to periodically maintain reachability (periodical registration update) if applicable, upon moving (mobility registration update), or in order to update its own capability or negotiate a protocol parameter again.

An initial registration procedure includes the execution of a network access control function (i.e., user authentication and access authentication based on a subscription profile within UDM). As the results of the registration procedure, the ID of a serving AMF within the UDM is registered.

Figure 13:
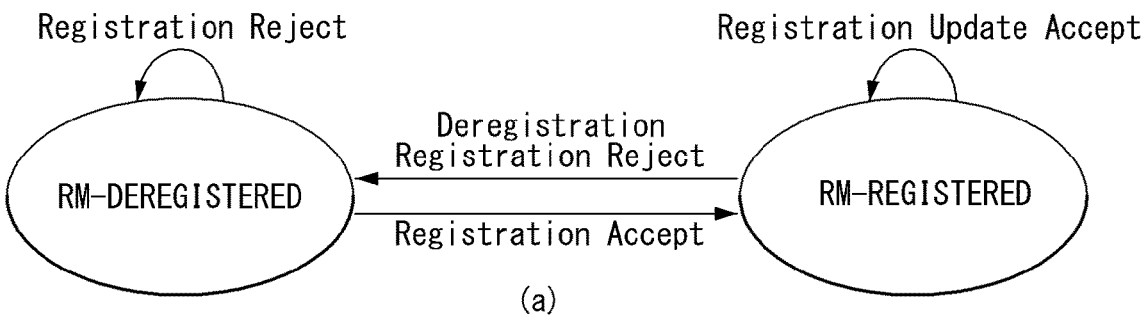
FIG. 13 illustrates an RM state model to which the present invention may be applied.
Figure 13:
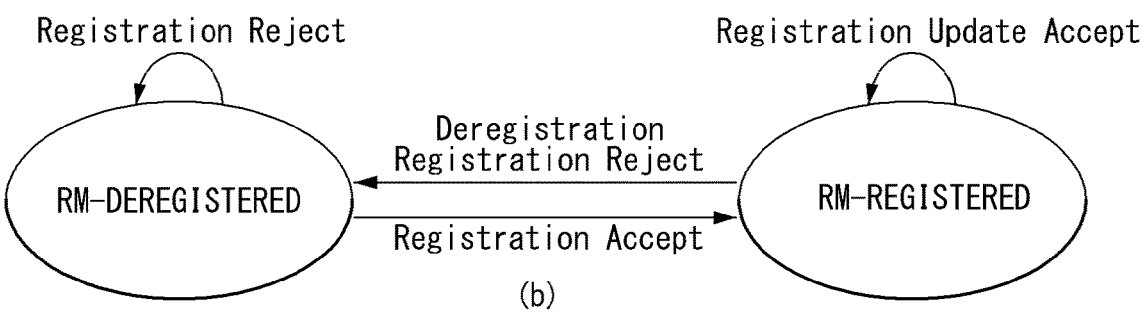

FIG. 13 illustrates RM state models to which the present invention may be applied. Specifically, FIG. 13(a) shows an RM state model within a UE, and FIG. 13(b) shows an RM state model within an AMF.

Referring to FIG. 13, in order to reflect the registration state of a UE within a selected PLMN, two RM states of RM-DEREGISTERED and RM-REGISTERED are used within the UE and the AMF.

In the RM-DEREGISTERED state, the UE is not registered with a network. The valid location or routing information of UE context within the AMF is not maintained. Accordingly, the UE is not reachable by the AMF. However, for example, in order to prevent an authentication procedure from being executed for each registration procedure, some UE context may be still stored in the UE and the AMF.

In the RM-DEREGISTERED state, if the UE needs to receive service that requests registration, the UE attempts registration with a selected PLMN using the initial registration procedure. Alternatively, upon initial registration, when the UE receives a Registration Reject, the UE remains in the RM-DEREGISTERED state. In contrast, when the UE receives the Registration Accept, it enters the RM-REGISTERED state.

In the RM-DEREGISTERED state, if applicable, the AMF accepts the initial registration of the UE by transmitting a Registration Accept to the UE, and enters the RM-REGISTERED state. Alternatively, if applicable, the AMF rejects the initial registration of the UE by transmitting a Registration Reject to the UE.

In the RM-REGISTERED state, the UE is registered with the network. In the RM-REGISTERED state, the UE may receive service that requests registration with the network.

In the RM-REGISTERED state, if the tracking area identity (TAI) of a current serving cell is not present within a list of TAIs that has been received by the UE from a network, the registration of the UE is maintained. The UE performs a mobility registration update procedure so that the AMF can page the UE. Alternatively, in order to notify a network that the UE is still in the active state, the UE performs a periodic registration update procedure when a periodical update timer expires. Alternatively, in order to update its own capability information or negotiate a protocol parameter with a network again, the UE performs a registration update procedure. Alternatively, if the UE does no longer require registration with a PLMN, the UE performs a deregistration procedure and enters the RM-DEREGISTERED state. The UE may determine deregistration from the network at any time. Alternatively, when the UE receives a Registration Reject message, a Deregistration message or performs a local deregistration procedure without the initiation of any signaling, it enters the RM-DEREGISTERED state.

In the RM-REGISTERED state, when the UE does no longer need to be registered with the PLMN, the AMF performs a deregistration procedure and enters the RM-DEREGISTERED state. The AMF may determine the deregistration of the UE at any time. Alternatively, after an implicit deregistration timer expires, the AMF performs implicit deregistration at any time. The AMF enters the RM-DEREGISTERED state after the implicit deregistration. Alternatively, the AMF performs local deregistration for the UE that has negotiated deregistration at the end of communication. The AMF enters the RM-DEREGISTERED state after local deregistration. Alternatively, if applicable, the AMF accepts or rejects registration update from the UE. The AMF may reject UE registration when it rejects the registration update from the UE.

Registration area management includes a function for allocating or re-allocating a registration area to the UE. The registration area is managed for each access type (i.e., 3GPP access or non-3GPP access).

When the UE is registered with a network through 3GPP access, the AMF allocates a set of tracking area (TA)(s) within a TAI list to the UE. When the AMF allocates a registration area (i.e., a set of TAs within the TAI list), the AMF may consider various types of information (e.g., a mobility pattern and an accepted/non-accepted area). The AMP having the whole PLMN or all of PLMNs as a serving area may allocate the whole PLMN, that is, a registration area, to the UE in the MICO mode.

A 5G system supports the allocation of a TAI list including different 5G-RAT(s) within a single TAI list.

When the UE is registered with a network through non-3GPP access, a registration area for the non-3GPP access corresponds to a unique reserved TAI value (i.e., dedicated to the non-3GPP access). Accordingly, there is a unique TA for the non-3GPP access to 5GC, which is called an N3GPP TAI.

When the TAI list is generated, the AMF includes only a TAI(s) applicable to access through which the TAI list has been transmitted.

2) Connection Management

Connection management (CM) is used to establish and release a signaling connection between the UE and the AMF. CM includes a function of establishing and releasing a signaling connection between the UE and the AMF through N1. The signaling connection is used to enable an NAS signaling exchange between the UE and a core network. The signaling connection includes both an AN signaling connection for the UE between the UE and the AN and an N2 connection for the UE between the AN and the AMF.

Figure 14:
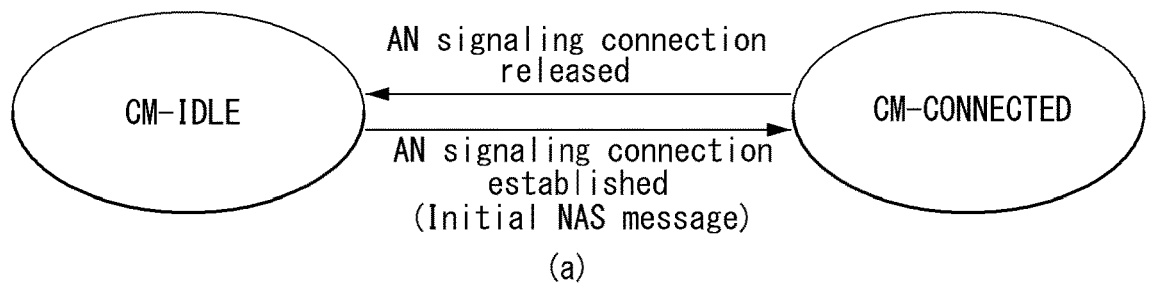
FIG. 14 illustrates a CM state model to which the present invention may be applied.
Figure 14:
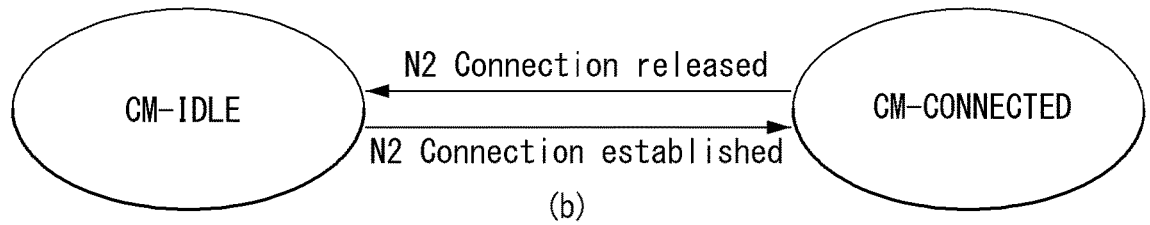

FIG. 14 illustrates CM state models to which the present invention may be applied. Specifically, FIG. 14 (a) illustrates a CM state shift within a UE, and FIG. 14 (b) shows a CM state shift within an AMF.

Referring to FIG. 14, in order to reflect the NAS signaling connection of the UE with the AMF, two CM states of CM-IDLE and CM-CONNECTED are used.

The UE in the CM-IDLE state is the RM-REGISTERED state and does not have an NAS signaling connection established with the AMF through N1. The UE performs cell selection, cell reselection and PLMN selection.

An AN signaling connection, an N2 connection and an N3 connection for the UE in the CM-IDLE state are not present.

In the CM-IDLE state, if the UE is not in the MICO mode, it responds to paging by performing a Service Request procedure (if it has received it). Alternatively, when the UE has uplink signaling or user data to be transmitted, it performs a Service Request procedure. Alternatively, whenever an AN signaling connection is established between the UE and the AN, the UE enters the CM-CONNECTED state. Alternatively, the transmission of an initial NAS message (Registration Request, Service Request or Deregistration Request) starts to shift from the CM-IDLE state to the CM-CONNECTED state.

In the CM-IDLE state, if the UE is not in the MICO mode, when the AMF has signaling or the mobile-terminated data to be transmitted to the UE, it performs a network-triggered service request procedure by transmitting a paging request to the corresponding UE. Whenever an N2 connection for a corresponding UE between the AN and the AMF is established, the AMF enters the CM-CONNECTED state.

The UE in the CM-CONNECTED state has an NAS signaling connection with the AMF through N1.

In the CM-CONNECTED state, whenever the AN signaling connection is released, the UE enters the CM-IDLE state.

In the CM-CONNECTED state, whenever an N2 signaling connection and N3 connection for the UE are released, the AMF enters the CM-IDLE state.

When an NAS signaling procedure is completed, the AMF may determine to release the NAS signaling connection of the UE. When the AN signaling connection release is completed, the CM state within the UE changes to the CM-IDLE. When an N2 context release procedure is completed, the CM state for the UE within the AMF changes to the CM-IDLE.

The AMF may maintain the UE in the CM-CONNECTED state until the UE is deregistered from a core network.

The UE in the CM-CONNECTED state may be an RRC Inactive state. When the UE is in the RRC Inactive state, UE reachability is managed by an RAN using assistant information from a core network. Furthermore, when the UE is in the RRC Inactive state, UE paging is managed by the RAN. Furthermore, when the UE is in the RRC Inactive state, the UE monitors paging using the CN and RAN ID of the UE.

The RRC Inactive state is applied to an NG-RAN (i.e., applied to an NR and E-UTRA connected to 5G CN).

The AMF provides assistant information to the NG-RAN in order to assist the determination of the NG-RAN regarding whether the UE will be changed to the RRC Inactive state based on a network configuration.

The RRC Inactive assistant information includes a UE-specific discontinuous reception (DRX) value for RAN paging during the RRC Inactive state and a registration area provided to the UE.

CN assistant information is provided to a serving NG RAN node during N2 activation (i.e., registration, a service request or path switch).

The state of an N2 and the N3 reference point is not changed by the UE that enters the CM-CONNECTED state accompanied by RRC Inactive. The UE in the RRC Inactive state is aware of an RAN notification area.

When the UE is the CM-CONNECTED state accompanied by RRC Inactive, the UE may resume an RRC connection due to uplink data pending, a mobile-initiated signaling procedure (i.e., periodical registration update), a response to RAN paging, or when the UE notifies a network that it has deviated from the RAN notification area.

When the connection of the UE in a different NG-RAN node within the same PLMN resumes, UE AS context is recovered from an old NG RAN node, and the procedure is triggered toward a CN.

When the UE is in the CM-CONNECTED state accompanied by RRC Inactive, the UE performs cell selection on a GERAN/UTRAN/EPS and complies with an idle mode procedure.

Furthermore, the UE in the CM-CONNECTED state accompanied by RRC Inactive enters the CM-IDLE mode and complies with an NAS procedure related to the following cases.

If an RRC resumption procedure fails,
If a movement to the CM-IDLE mode of the UE is required within a failure scenario that cannot be solved in the RRC Inactive mode.

The NAS signaling connection management includes a function for establishing and releasing an NAS signaling connection.

The NAS signaling connection establishment function is provided by the UE and the AMF in order to establish the NAS signaling connection of the UE in the CM-IDLE state.

When the UE in the CM-IDLE state needs to transmit an NAS message, the TIE initiates a service request or registration procedure in order to establish a signaling connection to the AMF.

The AMF may maintain the NAS signaling connection until the UE is deregistered from a network based on the preference of the UE, UE subscription information, a UE mobility pattern and a network configuration.

The procedure of releasing the NAS signaling connection is initiated by a 5G (R)AN node or the AMF.

When the UE detects the release of an AN signaling connection, the UE determines that the NAS signaling connection has been released. When the AMF detects that N2 context has been released, the AMF determines that the NAS signaling connection has been released.

3) UE Mobility Restriction

A mobility restriction restricts the service access or mobility control of a UE within a 5G system. A mobility restriction function is provided by a UE, an RAN and a core network.

The mobility restriction is applied to only 3GPP access, but is not applied to non-3GPP access.

In the CM-IDLE state and the CM-CONNECTED state accompanied by RRC Inactive, a mobility restriction is performed by a UE based on information received from a core network. In the CM-CONNECTED state, a mobility restriction is performed by an RAN and a core network.

In the CM-CONNECTED state, a core network provides a handover restriction list for a mobility restriction to an RAN.

The mobility restriction includes an RAT restriction, a forbidden area and a service area restriction as follows:

RAT restriction: the RAT restriction is defined as a 3GPP RAT(s) whose access of a UE is not permitted. A UE within a restricted RAT is not allowed to initiate any communication with a network based on subscription information.

Forbidden area: a UE is not allowed to initiate any communication with a network based on subscription information within a forbidden area under a specific RAT.

Service area restriction: it defines an area in which a UE can initiate cannot initiate communication with a network as follows:

Allowed area: if a UE is allowed by subscription information within an allowed area under a specific RAT, the UE is allowed to initiate communication with a network.

Non-allowed area: a service area for a UE is restricted based on subscription information within a non-allowed area under a specific RAT. The UE and the network are not allowed to initiate session management signaling for obtaining a service request or user service (both the CM-IDLE state and the CM-CONNECTED state). The RM procedure of the UE is the same as that in the allowed area. A UE within a non-allowed area responds to the paging of a core network as a service request.

In a specific UE, a core network determines a service area restriction based on UE subscription information. Optionally, an allowed area may be fine-tuned by a PCF (e.g., based on a UE location, a permanent equipment identifier (PEI) or a network policy). The service area restriction may be changed due to subscription information, a location, a PEI and/or a policy change, for example. The service area restriction may be updated during a registration procedure.

If a UE has an RAT restriction, a forbidden area, an allowed area, a non-allowed area or an area overlapping between them, the UE performs an operation according to the following priority:

The evaluation of the RAT restriction has precedence over the evaluation of any other mobility restriction;
The evaluation of the forbidden area has precedence over the evaluation of the allowed area and the non-allowed area; and
The evaluation of the non-allowed area has precedence over the evaluation of the allowed area.

4) Mobile Initiated Connection Only (MICO) Mode

A UE may indicate the preference of the MICO mode during initial registration or registration update. The AMF determines whether the MICO mode is permitted for the UE based on a local configuration, the preference indicated by the UE, UE subscription information and a network policy or a combination of them, and notifies the UE of the results during a registration procedure.

A UE and a core network re-initiates or exits from the MICO mode in the following registration signaling. If the MICO mode is not clearly indicated within a registration procedure and a registration procedure is successfully completed, the UE and the AMF do not use the MICO mode. That is, the UE operates as a general UE, and the network also treats a corresponding UE as a general UE.

The AMF allocates a registration area to a UE during a registration procedure. When the AMF indicates the MICO mode for the UE, the registration area is not restricted as a paging area size. If the AMF serving area is the whole PLMN, the AMF may provide the UE with the "whole PLMN" registration area. In this case, re-registration with the same PLMN attributable to mobility is not applied. If a mobility restriction is applied to a UE in the MICO mode, the AMF allocates an allowed area/non-allowed area to the UE.

When the AMF indicates the MICO mode for the UE, the AMF considers that the UE is always unreachable during the CM-IDLE state. The AMF rejects any request for downlink data transfer for a corresponding UE that is in the MICO mode and the CM-IDLE state. The AMF also delays downlink transport, such as SMS or location service through the NAS. A UE in the MICO mode may be reachable for mobile-terminated data or signaling only when the UE is in the CM-CONNECTED mode.

The AMF may provide an RAN node with pending data indication when a UE in the MICO mode can immediately transport mobile-terminated data and/or signaling when the UE switches to the CM-CONNECTED mode. When the RAN node receives the indication, the RAN node considers the information when it determines user inactivity.

A UE in the MICO mode does not need to listen to paging during the CM-IDLE state. The UE in the MICO mode may stop any AS procedure within the CM-IDLE state until it starts switching from the CM-IDLE to the CM-CONNECTED mode due to one of the following reasons.

If a change (e.g., configuration change) within the UE requires registration update to a network
If a periodic registration timer expires
If MO data is pending
If MO (Mobile Originating) signaling is pending
Service Request Procedure Hereinafter, a UE triggered service request procedure in CM-IDLE state is described.

The Service Request procedure is used by a 5G UE in CM-IDLE state to request the establishment of a secure connection to an AMF. The UE in CM-IDLE state initiates the Service Request procedure in order to transmit uplink signalling messages, user data, or response to a network paging request. After receiving the Service Request message, the AMF may perform authentication, and the AMF needs to perform the security procedure. After the establishment of a secure signalling connection to an AMF, the UE or network may transmit signalling messages, for example, PDU session establishment from UE to the network, or the SMF, via the AMF, may start the User Plane resource establishment for the PDU sessions requested by network and/or indicated in the Service Request message.

For an arbitrary Service Request, the AMF may respond with a Service Response message to synchronize PDU session status between a UE and a network. The AMF may also respond with a Service Reject message to the UE, in the case that the Service Request is unable to be accepted by the network.

For Service Request due to user data, a network may take further actions in the case that User Plane resource establishment is not successful.

This procedure may not applicable for an access network (once the UE is registered in the network) in which the UE is always considered as in CM-CONNECTED state and in which the User Plane resource is always considered established for an active PDU session.

Figure 15:
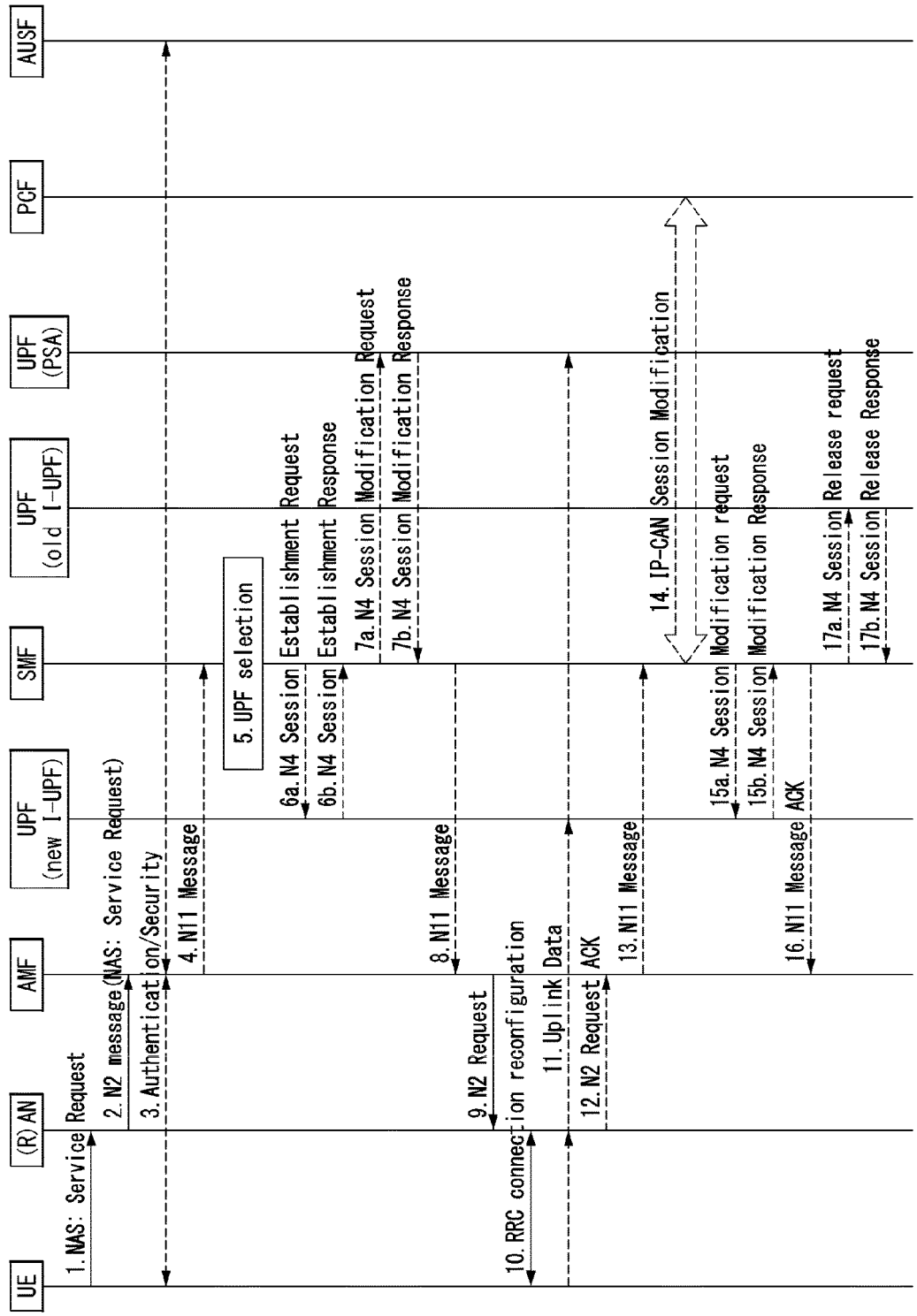
FIG. 15 illustrates a UE triggered Service Request procedure in CM-IDLE state which is applicable to the present invention.

FIG. 15 illustrates a UE triggered Service Request procedure in CM-IDLE state which is applicable to the present invention.

1. UE to (R)AN: MM NAS Service Request (PDU session ID(s), security parameters, PDU session status).

The UE transmits NAS message Service Request towards the AMF encapsulated in an RRC message to the RAN. The RRC message(s) that may be used to carry the 5G Temporary ID and this NAS message are described in RAN specifications.

When the Service Request is triggered for user data, the UE includes the PDU session ID(s) in NAS Service Request message to indicate the PDU session(s) that the UE needs to use. When the Service Request is triggered for signalling only, the UE doesn't include any PDU session ID. When this procedure is triggered for paging response, in the case that the UE needs to use some PDU session(s), the UE includes the PDU session ID(s) in MM NAS Service Request message to indicate the PDU session(s) that the UE needs to use. Otherwise the HE will not include any PDU session ID.

The PDU session status indicates the PDU sessions available in the UE.

2. (R)AN to AMF: N2 Message (MM NAS Service Request, 5G Temporary ID, Location information, RAT type, RRC establishment cause). Details of this step are described in RAN specifications. In the case that the AMF is unable to handle the Service Request, the AMF rejects the Service Request.

5G Temporary ID is obtained in RRC procedure. RAN selects the AMF according to Temporary ID. The Location Information and RAT type relates to the cell in which the UE is camping.

Based on the PDU session status, the AMF may initiate PDU session release procedure in the case that the PDU session is not available in the UE.

3. When the Service Request was not sent integrity protected or integrity protection is indicated as failed, the AMF needs to initiate NAS authentication/security procedure.

In the case that the UE triggered the Service Request to establish a signalling connection only, after the security exchange the UE and the network can transmit signaling and steps 4 and 7 to 12 are skipped.

4. [Conditional] AMF to SMF: N11 Message (PDU session ID(s), Cause(s), UE location information).

The N11 message is sent in one or more of the following scenarios:

In the case that the MM NAS Service Request message includes PDU session ID(s), or this procedure is triggered by SMF but PDU session IDs from UE correlates to other SMFs than the one triggering the procedure, the AMF transmits N11 message to SMF(s) associated with the PDU session ID(s) with Cause set to indicate "establishment of user plane resources" for a PDU session.
In the case that the UE is in MICO mode and the AMF has notified an SMF of the UE being unreachable and that SMF needs not transmit DL data notifications to the AMF, the AMF informs the SMF that the UE is reachable.

The AMF also notifies any other NF that subscribed to UE reachability that the UE is reachable.

5. Based on the new location information, the SMF checks the UPF Selection Criteria, and determines to perform one of the following:

Continue using the current UPF(s);
Select a new intermediate UPF, in the case that the UE has moved out of the service area of UPF that is connecting to RAN, while maintaining the UPF(s) acting as PDU Session Anchor; or Trigger re-establishment of the PDU Session to perform relocation of the UPF acting as PDU Session anchor.

6a. [Conditional] SMF to new UPF: N4 Session Establishment Request

In the case that the SMF selects a new UPF to act as intermediate UPF for the PDU session, an N4 Session Establishment Request message is sent to the new UPF, providing Packet detection, enforcement and reporting rules to be installed on the intermediate UPF. The PDU session anchor info for this PDU Session is also provided to the intermediate UPF.

6b. new UPF (intermediate) to SMF: N4 Session Establishment Response

The new intermediate UPF transmits an N4 Session Establishment Response message to the SMF. In the case that the UPF allocates CN tunnel info, the UPF provides CN DL tunnel information and UL tunnel information (i.e. CN N3 tunnel information) to the SMF. The SMF starts a timer, to be used in step 17a to release the resource in old intermediate UPF if there is one.

7a. [Conditional] SMF to UPF (PSA): N4 Session Modification Request

The SMF transmits N4 Session Modification Request message to PDU session anchor UPF, UPF (PSA), providing the DL tunnel information from new intermediate UPF.

7b. UPF (PSA) to SMF: N4 Session Modification Response

The UPF (PSA) transmits N4 Session Modification Response message to SMF.

8. [Conditional] SMF to AMF: N11 Message (N1 SM information (PDU session ID, PDU Session re-establishment indication), N2 SM information (PDU Session ID, QoS profile, CN N3 Tunnel Info, S-NSSAI)) to the AMF.

Upon reception of the N11 Message in 4 with cause including "establishment of user plane resources", the SMF determines whether UPF reallocation is performed, based on the UE location information, UPF service area and operator policies:

For PDU session that SMF determines to be served by the current PDU Session Anchor UPF in step 5, the SMF generates only N2 SM information and transmits N11 Message to the AMF to establish the User Plane. The N2 SM information contains information that the AMF shall provide to the RAN.

For PDU sessions that SMF determines that UPF reallocation for PDU Session Anchor UPF is needed in step 5, the SMF may transmit N11 Message containing only N1 SM information to UE via AMF. The N1 SM information includes the corresponding PDU session ID and PDU Session re-establishment indication.

Upon reception of the N11 Message in step 4 with an indication that the UE is reachable, in the case that the SMF has pending DL data, the SMF transmits N11 Message to the AMF to establish the User Plane for the PDU sessions, otherwise the SMF resumes transmitting DL data notifications to the AMF in case of DL data.

9. AMF to (R)AN: N2 Request (N2 SM information received from SMF, security context, AMF Signalling Connection ID, Handover Restriction List, MM NAS Service Accept).

RAN stores the Security Context, AMF Signalling Connection Id, QoS Information for the QoS Flows of the PDU Sessions that are activated and N3 Tunnel IDs in the UE RAN context. The step is described in detail in RAN specifications.

MM NAS Service Accept includes PDU session status in AMF. When N1 SM information is received from step 8, the Service Accept message also includes N1 SM information.

The AMF shall include at least one N2 SM information from SMF when the procedure is triggered for PDU session User Plane configuration. The AMF may transmit additional N2 SM information from SMFs in separate N2 message (e.g. N2 tunnel setup request), if there is any. Alternatively, in the case that multiple SMFs are involved, the AMF may transmit one N2 Request message to RAN after all the N11 messages from SMFs are received. In such a case, the N2 Request message includes the N2 SM information received in each of the N11 messages and information to enable AMF to associate responses to relevant SMF.

10. (R)AN to UE: The RAN performs RRC Connection Reconfiguration with the UE depending on the QoS Information for all the QoS Flows of the PDU Sessions activated and Data Radio Bearers. The User Plane security is established at this step, which is described in detail in RAN specifications.

The RAN forwards the MM NAS Service Accept to the UE. The UE locally deletes context of PDU sessions that are not available in 5G CN.

When the N1 message is present in the Service Accept and indicates that the any PDU session needs to be re-established, the UE initiates PDU session re-establishment after Service Request procedure is complete.

11. After the User Plane radio resources are setup, the uplink data from the UE may now be forwarded to RAN. The 5G RAN transmits the uplink data to the UPF address and Tunnel ID provided in the step 4.

12. [Conditional] (R)AN to AMF: N2 Request Ack (N2 SM information (RAN Tunnel info, List of accepted QoS Flows for the PDU Sessions activated, List of rejected QoS Flows for the PDU Sessions activated). This step is described in detail in RAN specifications.

The message may include N2 SM information(s), for example, RAN tunnel information. RAN may respond N2 SM information with separate N2 message (e.g. N2 tunnel setup response) in the case that the AMF transmits separate N2 message in step 5.

When multiple N2 SM information is included in the N2 Request message in step 5, the N2 Request Ack includes multiple N2 SM information and information to enable the AMF to associate the responses to relevant SMF.

13. [Conditional] AMF to SMF: N11 Message (N2 SM information (RAN Tunnel info), RAT Type) per accepted PDU Session to the SMF.

In the case that the AMF received N2 SM information (one or multiple) in step 8, then the AMF shall forward the N2 SM information to the relevant SMF. In the case that the UE Time Zone has changed compared to the last reported UE Time Zone, the AMF shall include the UE Time Zone IE in this message.

14. [Optional] SMF to PCF: If dynamic PCC is deployed, SMF may initiate IP-CAN Session Modification and provides new location information to the PCF.

15a. [Conditional] SMF to new intermediate UPF: N4 Session Modification Request
(RAN tunnel information).

In the case that a User Plane is to be setup or modified, the SMF initiates a N4 Session Modification procedure and provides RAN Tunnel Information.

15b. [Conditional] UPF to SMF: N4 Session Update Response.

16. [Conditional] SMF to AMF: N11 Message ACK.

17a. [Conditional] SMF to old intermediate UPF: N4 Session Release Request

In the case that there is an old intermediate UPF, the SMF initiates resource release, after timer in step 6b expires, by transmitting an N4 Session Release Request (Release Cause) to old intermediate UPF.

17b. Old intermediate UPF to SMF: N4 Session Release Response

The old UPF acknowledges with an N4 Session Release Response message to confirm the release of resources.

Hereinafter, a UE triggered service request procedure in CM-CONNECTED state is described.

The Service Request procedure is used by a 5G UE in CM-CONNECTED to request establish User Plane resources for the PDU sessions.

The procedure is not applicable for an access network (once the UE is registered in the network) in which the UE is always considered as in CM-CONNECTED state and in which the User Plane resource is always considered established for an active PDU session.

Figure 16:
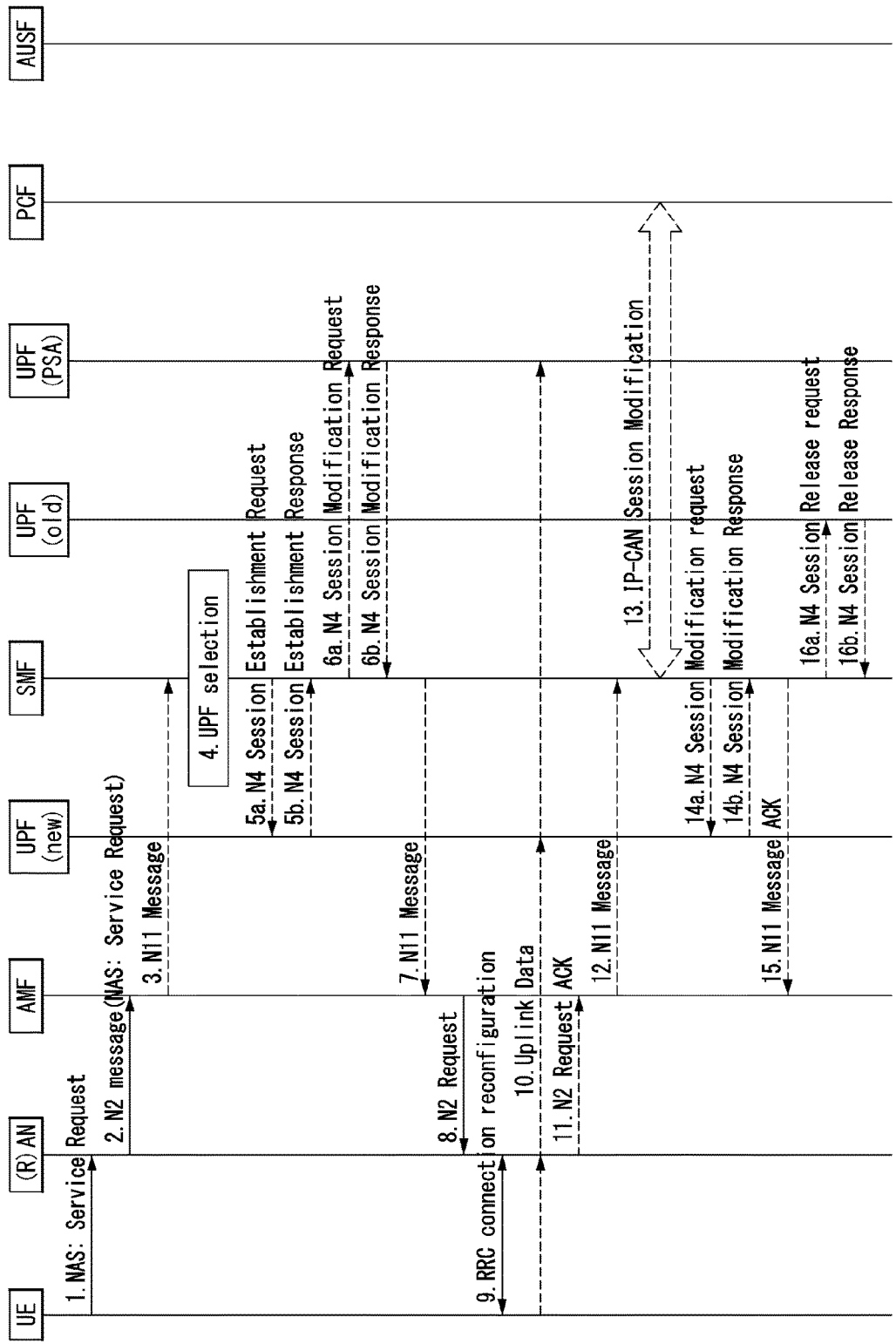
FIG. 16 illustrates a UE triggered Service Request procedure in CM-CONNECTED state which is applicable to the present invention.

FIG. 16 illustrates a UE triggered Service Request procedure in CM-CONNECTED state which is applicable to the present invention.

1. UE to (R)AN: MM NAS Service Request (PDU session ID(s)).

The UE transmits NAS message Service Request towards the AMF encapsulated in an RRC message to the RAN. The MM NAS Service Request message shall be encrypted and integrity protected. The PDU session ID(s) in NAS message Service Request message indicates the PDU session that the UE selects to activate.

2. (R)AN to AMF: N2 Message (MM NAS Service Request). Details of this step are described in RAN specifications. In the case that the Service Request is not unable to be handled by the AMF, the AMF reject the Service Request.

The (R)AN forwards the MM NAS Service Request message to the AMF based on the existing N2 connection.

3. [Conditional] AMF to SMF: N11 Message (PDU session ID(s)).

The AMF transmits N11 message to SMF(s) associated with the PDU session ID(s).

4. Based on the new location information, the SMF checks the UPF Selection Criteria. When a UE has moved out of the service area of UPF that connecting to RAN, SMF selects a new intermediate UPF.

5a. [Conditional] SMF to new intermediate UPF: N4 Session Establishment Request

When the SMF selects a new intermediate UPF for the PDU session, an N4 Session Establishment Request message is sent to the new intermediate UPF, providing Packet detection, enforcement and reporting rules to be installed on the T-UPF. The PDU session anchor information for this PDU Session is also provided to the T-UPF.

5b. new UPF to SMF: N4 Session Establishment Response

The new UPF transmits an N4 Session Establishment Response message to the SMF. In the case that the UPF allocates CN tunnel information, the UPF provides CN DL tunnel info and UL tunnel information (i.e. CN N3 tunnel information) to the SMF. The SMF starts a timer, to be used in step 17a to release the resource in old UPF if there is the resource.

6a. [Conditional] SMF to UPF (PSA): N4 Session Modification Request

The SMF transmits N4 Session Modification Request message to PDU session anchor UPF, UPF (PSA), providing the DL tunnel information for the new intermediate UPF.

6b. UPF (PSA) to SMF: N4 Session Modification Response

The UPF (PSA) transmits N4 Session Modification Response message to SMF.

7. [Conditional] SMF to AMF: N11 Message (N2 SM information (PDU Session ID, QoS profile, CN N3 Tunnel Info, S-NSSAI)) to the AMF.

The SMF generates N2 SM information and transmits N11 Message to the AMF to establish the User Plane(s) for the PDU sessions. The N2 SM information contains information that the AMF shall provide to the RAN.

8. [Conditional] AMF to (R)AN: N2 Request (N2 SM information (QoS profile, CN N3 Tunnel Info) received from SMF, MM NAS Service Accept).

In the case that there are multiple PDU Sessions that involves multiple SMFs, the AMF does not need wait for responses from all SMFs in step 3b.

9. (R)AN to UE: The RAN performs RRC Connection Reconfiguration with the UE depending on the QoS Information for all the QoS Flows of the PDU Sessions and Data Radio Bearers activated.

The RAN forwards the MM NAS Service Accept to the UE.

10. After the User Plane radio resources for the selected PDU session are setup, the uplink data from the UE can now be forwarded to RAN. The 5G RAN transmits the uplink data to the UPF address and Tunnel ID provided in the step 7.

11. [Conditional] (R)AN to AMF: N2 Request Ack (N2 SM information (RAN Tunnel info, List of accepted QoS Flows for the PDU Sessions activated, List of rejected QoS Flows for the PDU Sessions activated). This step is described in detail in RAN specifications.

The message may include N2 SM information(s), for example, RAN tunnel information. RAN may respond N2 SM information with separate N2 message (e.g. N2 tunnel setup response).

12. [Conditional] AMF to SMF: N11 Message (N2 SM information (RAN Tunnel info, List of accepted QoS Flows, List of rejected QoS Flows)) per accepted PDU Session to the SMF.

13. [Optional] SMF to PCF: When dynamic PCC is deployed, SMF may initiate IP-CAN Session Modification and provides new location information to the PCF.

14a. [Conditional] SMF to UPF: N4 Session Update Request (RAN tunnel info and List of accepted QoS Flows).

In the case that a User Plane is to be setup or modified the SMF initiates a N4 Session Modification procedure and provides RAN Tunnel Information.

14b. [Conditional] UPF to SMF: N4 Session Update Response.

15. [Conditional] SMF to AMF: N11 Message ACK.

16a. [Conditional] SMF to old UPF (intermediate): N4 Session Release Request

In the case that there is an old UPF (intermediate), the SMF initiates resource release, after timer in step 6b expires, by transmitting an N4 Session Release Request (Release Cause) to old UPF.

16b. Old UPF (intermediate) to SMF: N4 Session Release Response

The old UPF (intermediate) acknowledges with an N4 Session Release Response message to confirm the release of resources.

Hereinafter, a network triggered Service Request procedure is described below. This procedure includes aspects required to support network slicing, and should include notification from UPF upon MT UP data arrival.

This procedure is used when the network needs to signal (e.g. N1 signalling to UE, Mobile-terminated SMS, PDU session User Plane resource establishment to deliver mobile terminating user data) with a UE. In the case that the UE is in CM-IDLE state or CM-CONNECTED state, the network initiates a network triggered Service Request procedure. In the case that the UE is in CM-IDLE state, and asynchronous type communication is not activated, the network transmits a Paging Request to (R)AN/UE. The Paging Request triggers the Service Request procedure in the UE. In the case that asynchronous type communication is activated, the network stores the received message and forward the message to the (R)AN and/or the UE (i.e. synchronizes the context with the (R)AN and/or the UE) when the UE enters CM-CONNECTED state.

Figure 17:
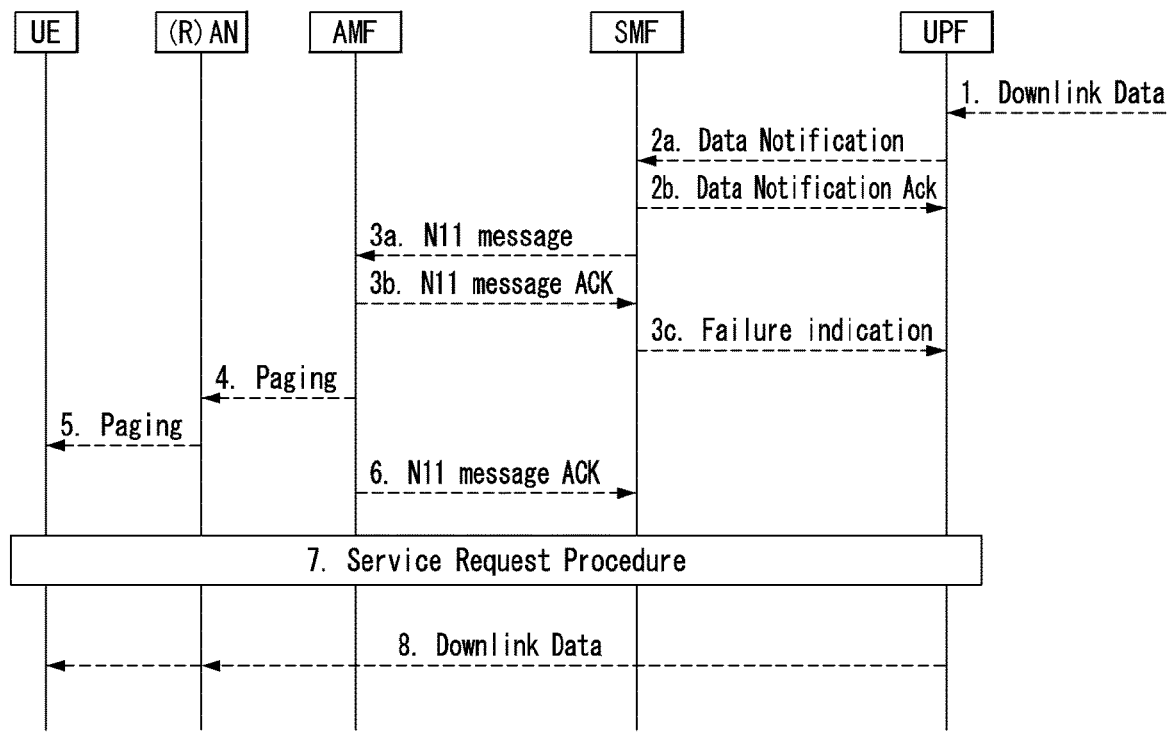
FIG. 17 illustrates a network triggered Service Request procedure which is applicable to the present invention.

FIG. 17 illustrates a network triggered Service Request procedure which is applicable to the present invention.

1. When UPF receives downlink data of a PDU session and there is no (R)AN tunnel information stored in UPF for the PDU session, the UPF buffers the downlink data, unless the UPF has previously been notified by the SMF to not buffer the downlink data.

2a. UPF to SMF: Data Notification (PDU session ID, Priority).

On arrival of the first downlink data packet, the UPF shall transmit Data Notification message to the SMF, in the case that the SMF has not previously notified the UPF to not transmit the Data Notification to the SMF (in which case the next steps are skipped).

When the UPF receives additional downlink data packets for a QoS Flow in the same PDU Session with the same or a lower priority than used in any previous Data Notification for this PDU session, the UPF buffers these downlink data packets without transmitting a new Data Notification. In the case that the UPF receives additional downlink data packets for a QoS Flow in the same PDU Session with a higher priority than used in any previous Data Notification for this PDU Session, the UPF shall transmit a Data Notification message to the SMF indicating the higher priority.

When the Paging Policy Differentiation feature is supported by the UPF and in the case that it is activated by the SMF for this N4 session, the UPF shall also include the DSCP in TOS (IPv4)/TC (IPv6) value from the IP header of the downlink data packet.

When the SMF, while waiting for the User Plane to be established in UPF, receives N11 message notifying the new AMF serving the UE from the new AMF, the SMF re-transmits the Data Notification message only to the new AMF.

2b. SMF to UPF: Data Notification Ack.

3a. SMF to AMF: N11 message (UE Permanent ID, PDU session ID, N2 SM information (QoS profile, CN N3 Tunnel Info), Priority).

Unless the SMF was previously notified that the UE is unreachable, upon reception of a Data Notification message, the SMF determines the AMF and transmits an N11 message (UE Permanent ID, PDU session ID, N2 SM information (PDU Session ID, QoS profile, CN N3 Tunnel Info, S-NSSAI), Priority, Paging Policy Indication) to the AMF including the Priority and PDU Session ID received in the Data Notification message as part of step 2a.

When the SMF, while waiting for the User Plane Connection to be activated, receives any additional Data Notification message for the same PDU session but with higher priority than indicated in any previous Data Notification for this PDU session, the SMF transmits a new N11 message indicating the higher priority and PDU Session ID to the AMF.

When the SMF, while waiting for the User Plane to be activated, receives an N11 message response from an AMF other than the one to which the SMF sent an N11 message, the SMF transmits the N11 message to this AMF.

When supporting Paging Policy Differentiation, the SMF indicates in the N11 message the Paging Policy Indication related to the downlink data that triggered the Data Notification message.

The AMF may receive request message(s) from other network functions which leads to signaling towards UE/'RAN (e.g. network initiated detach, SMF initiated PDU session modification). In the case that the UE is in CM-CONNECTED state and the AMF only delivers N1 message towards UE, the flow continues in step 7 below.

3b. [conditional] The AMF responds to the SMF.

In the case that the UE is in CM-IDLE state, and the AMF determines that the UE is not reachable for paging, the AMF shall either transmit an N11 message to the SMF, or other network functions from which AMF received the request message in step 3a, indicating the UE is not reachable, or the AMF performs asynchronous type communication and store the N11 message. In the case that asynchronous type communication is invoked and the AMF stored an N11 message, the AMF initiates communication with the UE and (R)AN when the UE is reachable, for example, when the UE enters CM-CONNECTED state.

In the case that the UE is in MICO mode, the AMF rejects the request from the SMF and may notify the SMF that the UE is unreachable (in case the SMF had not subscribed to the UE reachability) with an indication that the SMF needs not transmit DL data notifications to the AMF. The AMF stores an indication that the SMF has been informed that the UE is unreachable.

In the case that the Registration procedure with AMF change is in progress when the old AMF receives a N11 message, the old AMF may reject N11 message with an indication that the N11 message has been temporarily rejected.

3c. [Conditional] SMF responds to the UPF

SMF may notify the UPF about the User Plane setup failure.

When the SMF receives an indication from the AMF that the UE is unreachable the SMF may, based on network policies, either:

Indicate to the UPF to stop transmitting Data Notifications and/or to stop buffering DL data or apply extended buffering, or Refrain from transmitting further N11 messages for DL data to the AMF while the UE is in MICO mode.

Upon receiving the information that the N11 message requested from an SMF has been temporarily rejected, and receiving the Downlink Data Notification from UPF, the SMF may request the UPF to apply extended buffering.

4. [Conditional] AMF transmits Paging message to (R)AN node.

When the UE is in CM-CONNECTED state, the AMF performs step 5 to 12 in UE triggered Service Request procedure to activate the User Plane Connection for this PDU session (i.e. establish the radio resources and N3 tunnel). The rest of this procedure is omitted.

4. In the case that the UE is in RM-REGISTERED state and CM-IDLE and reachable, the AMF transmits a Paging message (NAS ID for paging, Registration Area list, Paging DRX length, Paging Priority indication) to (R)AN node(s) belonging to the Registration Area(s) in which the UE is registered.

When supporting Paging Policy Differentiation, the AMF may include Paging Policy Indication in Paging Request message.

Paging strategies may be configured in the AMF for different combinations of DNN, Paging Policy Indication, PDU Session IDs from SMF when available and other PDU Session context information identified by PDU Session ID received in N11 message.

Paging strategies may include:
Paging retransmission scheme (e.g. how frequently the paging is repeated or with what time interval);
Determining whether to transmit the Paging message to the (R)AN nodes during certain AMF high load conditions;
Whether to apply sub-area based paging (e.g. first page in the last known cell-id or TA and retransmission in all registered TAs).

The AMF and the (R)AN may support further paging optimisations in order to reduce the signalling load and the network resources used to successfully page a UE by one or several of the following means:
By the AMF implementing specific paging strategies (e.g. the N2 Paging message is sent to the (R)AN nodes that served the UE last);
By the AMF considering Information On Recommended Cells And RAN nodes provided by the (R)AN at transition to CM-IDLE state. The AMF determines the (R)AN nodes related part of this information into account to determine the (R)AN nodes to be paged, and provides the information on recommended cells within the N2 Paging message to each of these (R)AN nodes;
By the (R)AN considering the Paging Attempt Count Information provided by the AMF at paging.

In the case that the UE Radio Capability for Paging Information is available in the AMF, the AMF adds the UE Radio Capability for Paging Information in the N2 Paging message to the (R)AN nodes.

In the case that the Information On Recommended Cells And (R)AN nodes For Paging is available in the AMF, the AMF shall take that information into account to determine the (R)AN nodes for paging and, when paging a (R)AN node, the AMF may transparently convey the information on recommended cells to the (R)AN node.

The AMF may include in the N2 Paging message(s) the paging attempt count information. The paging attempt count information shall be the same for all (R)AN nodes selected by the AMF for paging.

5. [Conditional] The (R)AN node pages the UE.

When (R)AN nodes receive paging messages from the AMF, the UE is paged by the (R)AN node.

6. [Conditional] AMF to SMF: N11 message ACK.

The AMF supervises the paging procedure with a timer. In the case that the AMF receives no response from the UE to the Paging Request message, the AMF may apply further paging according to any applicable paging strategy described in step 3.

In the case that the AMF receives no response from the UE, the AMF considers the UE as unreachable and the SM N2 message cannot be routed to the (R)AN, so the AMF shall return an "N11 message Reject" with an appropriate "failure cause", e.g. UE unreachability, to SMF or other network functions to indicate the failure of "message routing service", unless the AMF is aware of an ongoing MM procedure that prevents the UE from responding, i.e. the AMF receives an N14 Context Request message indicating that the UE performs Registration procedure with another AMF.

When an "N11 message Reject" is received, SMF informs the UPF.

7. When UE is in the CM-IDLE state, upon reception of paging request, the UE initiates the UE triggered Service Request procedure (FIG. 15). In step 4a of FIG. 15, the AMF transmits N11 message to SMF(s) associated with the PDU session identified by PDU session ID(s) in MM NAS Service Request message if there is any. However, not to SMF(s) from which it receives the N11 message in step 3a.

8. The UPF transmits the buffered downlink data toward UE via (R)AN node which performed the Service Request procedure.

A network transmits downlink signaling in the case that the procedure is triggered due to request from other network entities described in step 3a.

Figure 18:
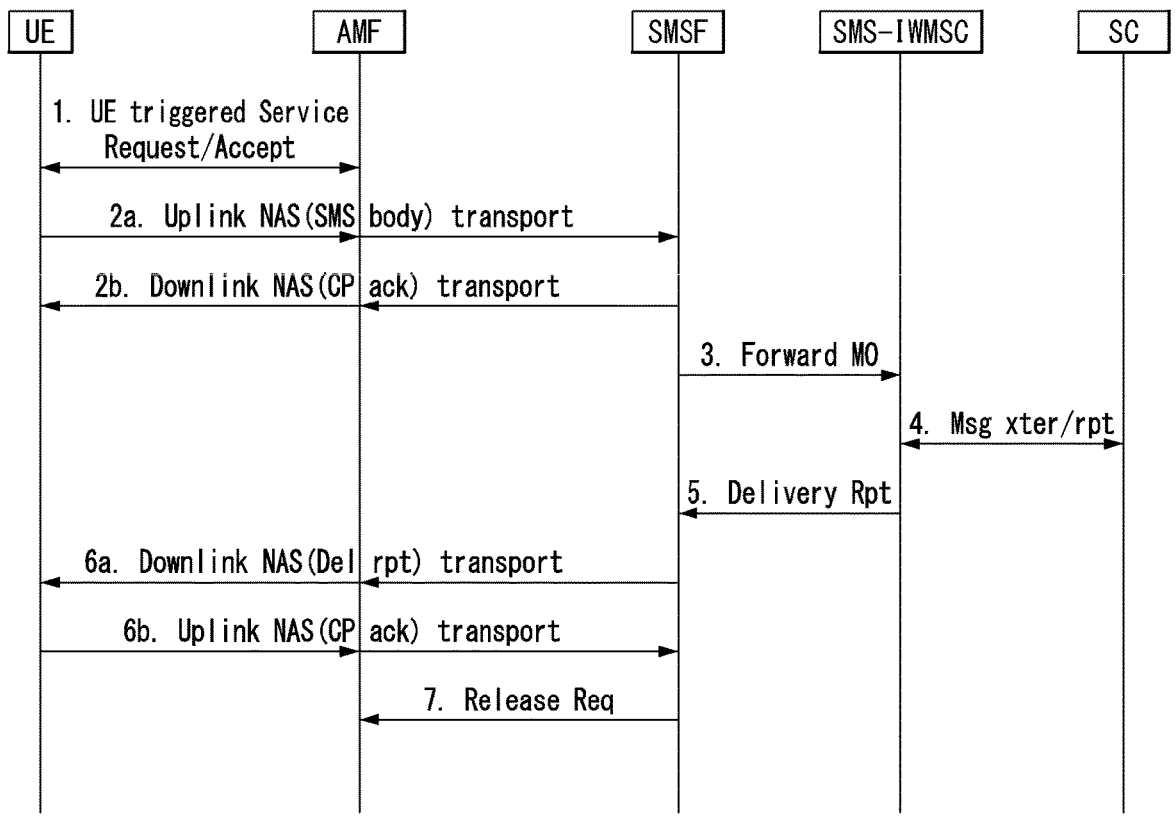
FIG. 18 illustrates MO SMS transmission procedure via NAS in CM-IDLE which is applicable to the present invention.

FIG. 18 illustrates MO SMS transmission procedure via NAS in CM-IDLE which is applicable to the present invention.

1. In the case that a UE under CM_IDLE mode is going to transmit uplink SMS message, then UE and network perform the UE triggered Service Request procedure firstly to establish a NAS signaling connection to AMF.

2. The UE builds the SMS message to be sent, as the SMS message includes CP-DATA/RP-DATA/TPDU/SMS-SUB-MIT parts. The SMS message is encapsulated in an NAS message with an indication indicating that the NAS message is for SMS transporting. The UE transmit the NAS message to the AMF. The AMF forwards the SMS message and SPUI to the SMSF serving the UE over N17 using uplink unit data message to permit the SMSF to create an accurate charging record, the AMF adds the IMEISV, the local time zone, and the UE's current TAI and x-CGI. The AMF forwards the SMS ack message from the SMSF to the UE using downlink unit data message.

3-5. This is based on the existing procedure defined in TS 23.040 [7].

6. SMSF forwards the delivery report to AMF via downlink unit data message which is forwarded to UE via Downlink NAS transport.

7. When no more SMS data is to be forwarded to UE, SMSF request the AMF to terminate this SMS transaction.

Figure 19:
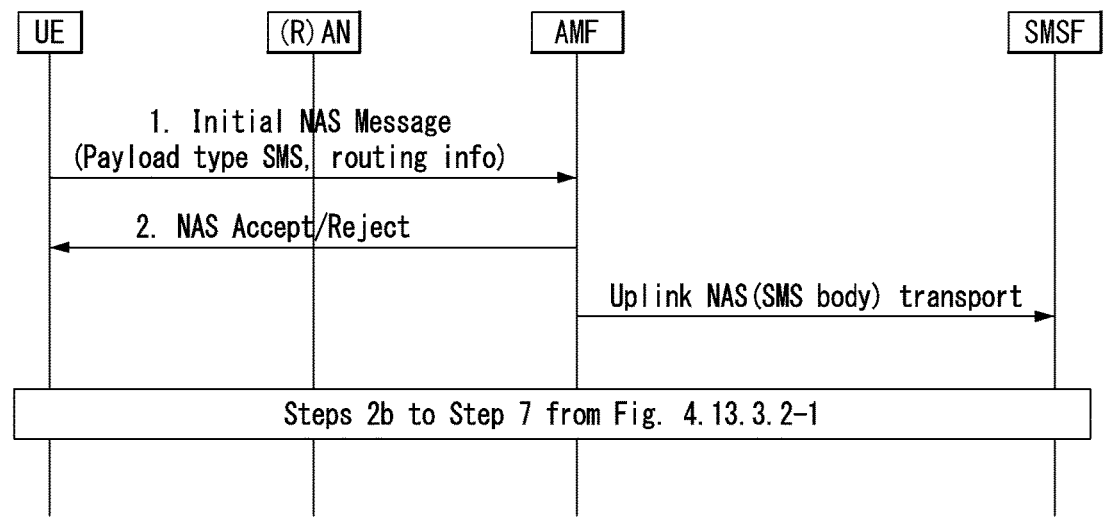
FIG. 19 illustrates MO SMS procedure using one step approach in CM-IDLE which is applicable to the present invention.

FIG. 19 illustrates MO SMS procedure using one step approach in CM-IDLE which is applicable to the present invention. Particularly, FIG. 19 shows the procedure for UE originated SMS messages using NAS Transport when the UE is in CM-IDLE mode with one step approach.

The UE may request during registration procedure to be able to perform NAS transport in an initial NAS message. The AMF determines whether to accept or reject based on its capability and local configuration.

1. After successful negotiation, when a UE is in CM-IDLE mode, and the UE needs to transport SMS over NAS, the UE may transmit the Payload Type and SMS Payload in an initial NAS message.

2. The AMF transmits a response to the initial NAS message either accepting or rejecting the UE initial NAS message.

MO SMS in CM-CONNECTED Mode procedure is specified by reusing the MO SMS in CM-IDLE Mode without the UE triggered Service Request procedure.

5GS MM

The main function of the 5GS mobility management (5GMM) sublayer is to support the identification, security, mobility of a UE as well as generic message transport.

A further function of the 5GMM sublayer is to provide connection management services to the other sublayer(s).

1. Types of 5GMM Procedures

Depending on how they may be initiated, three types of 5GMM procedures may be distinguished:

1) 5GMM Common Procedures

Initiated by the network or the UE and used to carry a 5GMM message and/or any other encapsulated message(s), for example, SMS or when the AMF wants to change UE configuration. The procedures belonging to this type are:

Initiated by the network:
network-initiated SM message transport.
network-initiated non-SM message transport.
network-initiated NAS transport.
generic UE Configuration update.
Initiated by the UE:
UE-initiated SM message transport.
UE-initiated non-SM message transport.
UE-initiated NAS transport.

2) 5GMM Specific Procedures:

At any time only one UE initiated 5GMM specific procedure may be running for each of the access network(s) that the UE is camping in. The procedures belonging to this type are Initiated by the UE and used, for example, to register to the network for 5GS services and establish a 5GMM context, to update the location/parameter(s) of the UE. The procedures belonging to this type is as below:

Registration.

Initiated by the UE or the network and used to deregister from the network for 5GS services and to release a 5GMM context:

De-registration.

3) 5GMM Connection Management Procedures:

Initiated by the UE and used to establish a secure connection to the network or to request the resource reservation for transmitting data, or both:

Service request.

The service request procedure may only be initiated in the case that no UE initiated 5GMM specific procedure is ongoing for each of the access network(s) that the UE is camping in.

Initiated by the network and used to request the establishment of an N1 NAS signaling connection or to prompt the UE to perform re-registration if necessary as a result of a network failure; not applicable for the non-3GPP access network:

Paging.

Hereinafter, EMM and ESM for Service Request procedure in EPC are described. Followings represents parts that (E)MM process in the EPC existing technique is influenced by the ESM. This is a part related to Service Request procedure.

1. Service Request Procedure not Accepted by the Network

In the case that the service request cannot be accepted, the network shall return a SERVICE REJECT message to the UE including an appropriate EMM cause value.

The MME may be configured to perform MME-based access control for mobile originating CS fallback calls for a certain area A by rejecting related service request with EMM cause #39 "CS service temporarily not available".

Dependent on implementation and operator configuration the area A may be configured with the granularity of an MME area, tracking area or eNodeB service area.

The MME may further be configured for a certain area A' to exempt service requests for mobile originating CS fallback calls from this MME-based access control, if:

The service request is initiated in EMM-IDLE mode; and
The UE indicated support of eNodeB-based access control for mobile originating CS fallback calls during an attach or tracking area updating procedure.

The operator may use this second option when the eNodeBs in area A' are supporting the eNodeB-based access control for CS fallback calls. The area A' may be part of area A or the whole area A. It is the responsibility of the operator to coordinate the activation of MME-based access control and eNodeB-based access control for mobile originating CS fallback calls.

When the EMM cause value is #39 "CS service temporarily not available", the MME shall include a value for timer T3442 in the SERVICE REJECT message. In the case that a mobile terminating CS fallback call is aborted by the network during call establishment, the MME shall include the EMM cause value #39 "CS service temporarily not available" and set the value of timer T3442 to 'zero'.

In the case that a service request from a UE with only LIPA PDN connections is not accepted due to the reason, depending on the service request received, the MME shall include the following EMM cause value in the SERVICE REJECT message:

In the case that the service request received is not due to CS fallback or 1×CS fallback, EMM cause value #10 "implicitly detached"; or
In the case that the service request received is due to CS fallback or 1×CS fallback, EMM cause value #40 "no EPS bearer context activated".

In the case that a service request from a UE with only remaining SIPTO at the local network PDN connections is not accepted due to the reasons specified, depending on the service request received, the MME shall:

In the case that the service request received is due to CS fallback or 1×CS fallback, include the EMM cause value #40 "no EPS bearer context activated" in the SERVICE REJECT message; or
In the case that the service request received is not due to CS fallback or 1×CS fallback, abort the service request procedure and transmit a DETACH REQUEST message to the UE with detach type "re-attach required".

Hereinafter, the EMM and the ESM for the attach procedure in an EPC is described. Below represents the part in which the (E)MM operation is influenced by the ESM in the conventional EPS technique. This is the part in relation to the attach procedure.

2. Attach not Accepted by the Network

In the case that the attach request may not be accepted by the network, the MME shall transmit an ATTACH REJECT message to the UE including an appropriate EMM cause value.

In the case that EMM-REGISTERED without PDN connection is not supported by the UE or the MME, the attach request included a PDN CONNECTIVITY REQUEST message, the attach procedure fails due to:

a default EPS bearer setup failure;
an ESM procedure failure; or
operator determined barring is applied on default EPS bearer context activation during attach procedure, The MME shall:
  combine the ATTACH REJECT message with a PDN CONNECTIVITY REJECT message contained in the ESM message container information element. In this case the EMM cause value in the ATTACH REJECT message shall be set to #19 "ESM failure"; or
  transmit the ATTACH REJECT message with the EMM cause set to #15 "No suitable cells in tracking area", if the PDN connectivity reject is due to ESM cause #29 subject to operator policies. In this case, the network may additionally include the Extended EMM cause IE with value "E-UTRAN not allowed".

3. Combined Attach not Accepted by the Network

In the case that the attach request can neither be accepted by the network for EPS nor for non-EPS services, the MME shall transmit an ATTACH REJECT message to the UE including an appropriate EMM cause value. In the case that EMM-REGISTERED without PDN connection is not supported by the UE or the MME, the attach request included a PDN CONNECTIVITY REQUEST message, and the attach procedure fails due to a default EPS bearer setup failure, an ESM procedure failure or operator determined barring, the MME shall:
  combine the ATTACH REJECT message with a PDN CONNECTIVITY REJECT message contained in the ESM message container information element. In this case the EMM cause value in the ATTACH REJECT message shall be set to #19, "ESM failure"; or
  transmit the ATTACH REJECT message with the EMM cause set to #15 "No suitable cells in tracking area", if the PDN connectivity reject is due to ESM cause #29 subject to operator policies. In this case, the network may additionally include the Extended EMM cause IE with value "E-UTRAN not allowed".

Network Handling Method for Service Request Procedure

According to the Service Request procedure described with reference to FIG. 15 above, in the case that a PDU session ID is included in the service request message, it is unclearly defined when a service accept message (or service reject message) is to be transmitted (problem 1).

In addition, according to step 9 of the Service Request procedure, in the case that the AMF receives at least one N2 Session Management (SM) information from SMF, the AMF does not wait for the transmission of the additional N2 SM information from the corresponding SMF, but directly forwards the N2 SM information to (R)AN. In this case, the additional N2 SM information transmitted from the corresponding SMF is forwarded to (R)AN by the AMF through a separate N2 message (e.g., N2 tunnel setup request). The AN that receives such N2 SM information performs an RRC reconfiguration procedure as in step 10, and even in this case, it is unclearly defined when (e.g., whether to start it after receiving the additional N2 SM information) or which way the connection reconfiguration setup procedure is performed by AN (problem 1), specifically.

Accordingly, in the present disclosure, the embodiments for defining a part of unclear step/process in the Service Request procedure are proposed as below.

The present invention proposed below is mainly described by targeting the embodiment which is applicable to UE triggered Service Request in CM-IDLE state procedure of TS 23.502, but the present invention is not limited thereto, and also applicable to UE triggered Service Request in CM-CONNECTED state of TS 23.502 and the registration procedure of TS 23.502. Particularly, the present invention may be applied to the case that PDU session ID information is included in N1 message (e.g., Service Request message or Registration Request message) in the corresponding procedure(s).

The embodiment below is mainly described based on the Service Request procedure, but the message may be switched to/replaced by a message and used/applied in accordance with the Registration procedure when the embodiment is applied to the Registration procedure of TS 23.502. For example, the Service Request message, the Service Accept message and the Service Reject message in the following embodiments may be switched to/replaced by the Registration Request message, the Registration Accept message and the Registration Reject message and used/applied.

In the present invention, the interaction between AMF and SMF when a UE transmits a Service Request message (or Registration (Request) message) among 5G Mobility management (MM) messages is mainly described, but also applicable to all cases that 5G MM message is transmitted in other network function but AMF.

In addition, in the present invention, as 5G MM message, all procedures of 5G MM messages initiated by a UE may be applied among 5GS MM procedures. For example, as the 5G MM message of the present invention, except the Service Request message and the Registration (Request) message, a UL NAS transport message or a generic UE setup update, or the like may be applied.

However, for the 5G MM message, not the Service Request message, the following differences may be existed (however, the 5G MM message of the case of performing a PDU session establishment simultaneously together with the registration (e.g., when performing TAU procedure in EPC, an active flag is configured) may not be different from the Service Request message). For example, an SM message, not a PDU session ID, may be included in the 5G MM message, not the Service Request message. In the case that the 5G MM message, not the Service Request message, is forwarded to the AMF together with the SM message, the AMF may forward the N11 message with the corresponding SM message to the SMF. In this case, the SMF transmits the N11 response message in response to the N11 message received from the AMF with the SM (response) message to the SM message received from the UE. The AMF that receives the N11 response message transmits the SM (response) message transmitted with being included in the N11 response message to the UE.

By considering such differences, the present invention may also be identically/similarly applied to the 5G MM message, not the Service Request message.

In addition, the network function of the present invention may mean all network functions that have an interface with the AMF. For example, the network function of the present invention may be commonly called as SMSF, PCF, UDM and/or AUSF.

Further, in the present invention, it is assumed the case that, when the AMF receives information related to SM (e.g., PDU session ID) together with MM request (i.e., Service Request message), the MM request is accepted. That is, the present invention relates to the procedure after the AMF accepts the request for connection/mobility management in 5GMM aspect, and transmits the N11 message to the SMF. In the case that the AMF receives SM related information (e.g., PDU session ID) together with the MM Request (e.g., Service Request message) but rejects the MM request, the AMF may transmit MM Reject message (e.g., Service Reject message) to the UE without regard to SMF decision (i.e., without transmitting N11 message to the SMF).

In the conventional art, the PDU session ID information is described as PDU session ID, but may be represented/signaled with information of other format indicating a PDU session in the present invention. For example, the PDU session ID information may be represented/signaled to indicate a PDU session ID explicitly/implicitly or represented/signaled with bitmap information.

In the case that it is determined to a scenario that UPF relocation is not occurred among the Service request procedures, when the SMF responds to the N11 message transmitted by the AMF, the case that the N11 response message includes the N1 SM information may not occur. Such a scenario may be applied to the embodiment excluding that the N1 SM information is transmitted/included in the present invention.

Invention proposal 1) Operation proposal for solving problem 1 described above

In the case that a UE transmits a PDU session ID to a network together with a service request message, AMF may receive and process the service request message, and select the SMF to which a PDU session ID is transmitted. In addition, the AMF may forward N11 message including the corresponding PDU session ID to the selected SMF. When the SMF receives the PDU session ID included in the N11 message, the SMF may determine whether to accept or reject establishment of the PDU session that corresponds to the PDU session ID, and inform/transmit the accept/reject response information/message (corresponding to N11 response information/message) for it with being included in the N11 response message. The accept/reject determination of the PDU session establishment may be determined based on state/problem of the SMF or the UPF or based on state/problem of the UE.

At this time, the following two cases may be assumed.

1. The case that the AMF does not know whether the response to the PDU session ID included in the N11 (response) message received from the SMF is reject or accept 2. The case that the AMF knows whether the response to the PDU session ID included in the N11 (response) message received from the SMF is reject or accept In the case of 1, since the AMF does not know whether the response to the PDU session ID is accept or reject, the AMF may perform a response to the MM response message (e.g., transmit Service Reject/Accept message) regardless of the response from the SMF. However, in this case, even in the case that the UE fails to establish a session for the PDU session ID requested by the UE, the UE may receive an MM Accept message (e.g., Service Accept message). In this case, even in the case that the session establishment for all requested PDU session IDs is not successful; the UE may receive the MM Accept message. As a result, without attaining the object of transmitting and receiving data through the PDU session establishment, the UE is left as a state in which only NAS signaling connection is kept while receiving the Service Accept message. In this state, in the case that the UE re-requests the establishment of the PDU session which is the same as the rejected PDU session requested previously, the UE may receive SM reject again from the SMF. Accordingly, even in the case that there is NAS signaling connection, the UE may not request for the same PDU session to the same SMF or the request is limited for a predetermined time. Due to this reason, in the case that the UE that requests the PDU session establishment receives SM Reject message from the SMF, it is not helpful to keep the NAS signaling connection.

Accordingly, as described above, in order to solve the problem that may occur when the UE receives the MM Accept message (e.g., Service Accept message) and the NAS signaling connection is kept, that is, to prevent the UE from being kept in EMM-CONNECTED mode and unnecessary resource waste of the network, the following operation may be performed.

1) UE performs a procedure for releasing NAS signaling connection.

2) UE performs a detach request procedure.

On the contrary, in the case of 2, since the AMF knows whether the response to the PDU session ID is accept or reject, the AMF may determine MM reject or MM accept according to the response from the SMF.

For example, in the case that the UE transmits the MM Request message (e.g., Service Request message) together with the PDU session ID to the AMF, the AMF may accept the MM Request (message) and wait for a response from the SMF after forwarding SM message as N11 message to the SMF. At this time, in the case that the responses from all SMFs include a reject for the PDU session establishment, the AMF may decide MM reject without regard to the accept decision to the MM Request, and transmit MM Reject message to the UE.

Meanwhile, the embodiment of case 2 may be divided into the case that the AMF may identify only whether the PDU session establishment (or a response to the PDU session ID requested by the UE) is reject or accept and the case that the AMF may further identify the reject cause additionally. Unless there is special mention in the present invention, it is assumed that the AMF may distinguish only whether the PDU session establishment (or a response to the PDU session ID requested by the UE) is reject or accept, but not limited thereto.

Detailed invention proposal 0) proposes an invention proposal applicable to both of cases 1 and 2, and detailed invention proposal 1) proposes an invention proposal for the case that the AMF knows whether the SM message (for the requested PDU session ID) included in the N11 (response) message received from the SMF is reject or accept (i.e., case 2).

Detailed Invention Proposal 0)

In the case that the SMF transmits the N11 response message including the SM reject to the PDU session ID to the AMF, the SMF may transmit a separate indication to the AMF or transmit the N11 response message including the rejection cause as the IE to the AMF such that the AMF may distinguish the case of rejection due to the cause and the case of rejection due to other cause.

In the case that the reject cause is the problem of the SMF itself, not the problem of the UE (e.g., the case that the SMF is congested (in this case, the reject cause such as "SMF congestion" or "SMF reselection is required" may be used/signaled), or the case that interaction with other NF is required to process the DNN requested by the UE or the UE's request, but an interface with the corresponding NF is not existed or not connected due to a temporal problem);

Or

The case that the problem may be solved by reselecting the SMF.

In this case, the SMF may transmit the reject cause or indication such as "SMF congestion", "SMF reselection is required" or "corresponding NF is not reachable" with being included in the N11 response message such that the AMF may identify it.

The AMF that receives it may solve the problem by reselecting the SMF, and in the case that other alternative/new SMF is existed, without any separate interaction with the UE, the AMF may transmit the SM message included in the N1 message received from the UE (i.e., the SM message rejected by the old SMF) with being included in the N11 message to the alternative/new SMF.

At this time, after the AMF receives the N1 message from the UE, the time until the AMF forwards a response therefor (e.g., N1 response message or DRB establishment) to the UE shall be smaller than a configured/started timer value for checking whether the N1 message transmission is successful. Otherwise, a retransmit of the N1 message of the UE may occur before the AMF transmits a response to the UE, and owing to this, the operation of the AMF is reset and may cause an unnecessary signaling only. Accordingly, considering this, the AMF shall generate/perform the operation from reselecting the SMF and receiving the N11 response message from the SMF to responding/forwarding it to the UE until the N1 message retransmit of the UE.

The embodiment may also be applied to the interaction between the SMF and the UDF. For example, the proposed embodiment may be applied when performing steps 6a and 6b or steps 7a and 7b of FIG. 15.

So far, the method for solving the SM reject problem cause from the old SMF by SMF reselection has been described.

Similarly, the SMF provides guides related to the reject cause or the MM operation after rejection to the AMF through the N11 response message, and accordingly, it may be helpful for AMF subsequent process/operation.

Detailed invention proposal 1-1) Condition of transmitting a Service Accept message Option 1) The case may be considered that the AMF waits for the responses from all SMFs that transmit the N11 message in step 4 of the Service Request procedure of FIG. 15 and after identifying the response from all SMFs, the AMF transmits the Service Accept or Reject message with the response. The AMF may operate as follows depending on the result of identifying the response from all SMFs that transmit the N11 message:

1. In the case that the AMF receives even one N11 response message including SM Accept or meaning it from the SMF in response to the SM request (e.g., PDN session establishment request) for the PDU session ID transmitted by the N11 message, the AMF may transmit MM Accept message (e.g., Service Accept message) to the UE.

2. With respect to the SM request e.g., PDN session establishment request) for the PDU session ID transmitted by the N11 message, the AMF fails to receives even one N11 response message including SM Accept or meaning it from the SMF (i.e., in the case that the response from all SMFs is SM reject or 'no response'), the AMF may transmit the MM reject message (e.g., Service Reject message) to the UE.

3. The AMF may transmit the Service Accept message as a service response message always without regard to the response from the SMF. At this time, in the case that the PDU session is rejected by the SMF, the Service Accept message including the rejected PDU session ID and the reject cause therefor may be transmitted to the UE.

Option 2)

The AMF may receive the N11 response message for the N11 message transmitted to the SMF in step 4 of the Service Request procedure in step 8. When one or more receive N11 response message includes N1 SM information and/or N2 SM information, the AMF may regard it as a success of the Service Request procedure. That is, at the moment of receiving the first N11 (response) message including the N1 SM information and/or the N2 SM information, the AMF determines this as a success of the Service Request procedure. Here, the N1 SM information may correspond to SM response information of the SMF for the UE and the N2 SM information may correspond to SM response information of the SMF for NG-RAN.

In the case of Option 2, since the Service Accept message is transmitted to the UE within a short time, there is an advantage that the UE may determine whether the Service Request procedure is succeeded quickly.

When receiving the first N11 (response) message including the N1 SM information and/or the N2 SM information, the AMF may transmit the Service Accept message to the UE. With this, the signaling optimization embodiment below may be applied.

[Signaling optimization embodiment] (commonly applicable to option 1 and 2)

As described above, in the case that the AMF receives the first N11 (response) message including the N1 SM information and/or the N2 SM information including/meaning SM Accept for the PDU session ID requested by the UE (i.e., in the case that a transmission condition of the Service Request message is satisfied), in order to reduce signaling overhead of the Service Accept message, the AMF may not signal/transmit the Service Accept message. Instead, the UE may determine whether the Service Request procedure is succeeded through Data Radio Bearer (DRB) which is generated by the RRC connection reconfiguration performed in step 10 of FIG. 15. That is, the UE-AS (UE-RRC) layer may transmit 'User plane bearer establishment' indication to the UE-NAS layer when the DRB is successfully established, and through this, the UE-NAS layer may identify that the Service Request procedure is succeeded.

[Method for configuring N11 (response) message], [Method for determining N11 response message reception failure], [Method for configuring N1 (response) message] and [Method for transmitting MM Reject message (e.g., Registration Reject message or Service Reject message)] describe below may be commonly applied to option 1 and 2 described above.

[Method for configuring N11 response message] (common to option 1 and 2)

A response to the N11 message that the AMF transmitted to the SMF in step 4 of the Service Request procedure of FIG. 15 may be one of the followings:

A. N11 (response) message including at least one of the following information is transmitted:
   A-1) N1 SM information;
   A-2) N2 SM information; and/or
   A-3) Reject cause
B. N11 (response) message is not received (the case of failing to receive N11 response message)

The N1 SM information may be transmitted with being included in the N11 (response) message, and according to the format of signaling/configuring the N1 SM information of the SMF, the following options may be existed.
   N1 SM information is included as a container form of the N11 (response) message
   After a separate SM message for transmitting the N1 SM information, the SM message is included as a container form of the N11 (response) message.

Additionally, even in the case that a reject cause is included in the N11 (response) message, the option as the same as the case that the N1 SM information is included may be considered. At this time, the reject cause 3) may also be forwarded to the UE as the N1 SM information. In this case, an indication for the AMF to distinguish whether the N1 SM information includes/means Accept for the PDU session ID requested by the UE or includes/means Reject may be included in the N11 (response) message separately (since the AMF is unable to identify the N1 SM information (signaling information between SMF-UE). The AMF may distinguish whether the SM response is Accept or Reject from the SMF through the indication. Otherwise, the reject cause 3) may be received through the N11 (response) message by being signaled as information that the AMF may identify. In this case, the AMF may determine whether the corresponding PDU session ID is accepted based on whether the reject cause is included without the separate indication described above (e.g., in the case that the reject cause is signaled/included in the N11 (response) message, the AMF may identify that the PDU session ID is rejected based on the corresponding reject cause.

In relation to A-1) and A-2), the description of FIG. 15 may be applied.

For A-3) case, in the case that the SMF is unable to accept the N11 message transmitted in step 4 of FIG. 15, the cause for the rejection may be transmitted by being included in the N11 (response) message.

For example, the N11 (response) message may be configured to include at least one of the followings:
I. Container including N1 SM information
II. Container including N2 SM information
Ill. Container including reject cause (of SMF) (i.e., 'reject cause container')

The AMF may not identify the information in the included container. Instead, according to/based on whether to include the container, the AMF may determine whether the response is Accept or Reject and the operation to perform when the response is Accept. For example, in the case that at least one reject cause container is transmitted by being included in the N11 (response) message, the AMF may regard a response of the SMF as rejection.

In the case that identification for the SM reject cause of the SMF is allowed, it may be signaled/represented by a separate IE, not the container described above. In this case, the AMF may know a response of the SMF (e.g., whether to accept/reject) by directly identifying the SM reject cause through the corresponding IE.

In the case that I) or II) described above is included in the N11 (response) message, the AMF may identify that the response from the SMF is Accept. In the case that III) described above is included in the N11 (response) message, the AMF may identify that the response from the SMF is Reject.

It is as described above that the reject cause of A-3) described above may be forwarded as N1 SM information. In this case, an indication for the AMF to distinguish whether the N1 SM information includes/means Accept for the PDU session ID requested by the UE or includes/means Reject shall be included in the N11 (response) message, and in this case, the AMF may distinguish whether the SM response from the SMF is Accept or Reject through the indication, which is as described above.

That is, in summary, the reject cause of A-3) may be i) forwarded as N1 SM information, ii) transmitted with being included in the reject cause container which is separately defined, or iii) transmitted with being included in the IE which is separately defined so as to be identified by the AMF, and the description according to each embodiment is as described above.

[Method for Determining N11 Response Message Reception Failure] (Common to Option 1 and 2)

In the case of B) described above, in order to determine the case that the N11 response message is not received (i.e., reception failure) and whether the N11 message is transmitted well in step 4 of FIG. 15, the following embodiment may be proposed.

First, while transmitting the N11 message to the SMF, the AMF may start a specific timer for each SMF (e.g., timer Tabcd) with being configured as a specific value.

In the case that the AMF receives the N11 response message from the old SMF before the timer Tabcd expires, the AMF terminates Tabcd and determines that the N11 response message is received from the SMF.

In the case that the AMF fails to receive the N11 response message from the old SMF until the timer Tabcd expires, the AMF determines that there is no N11 response message from the SMF (i.e., reception failure of the N11 response message).

In this embodiment, the timer Tabcd value may be set as smaller than the timer value for the UE to determine whether a transmission of the Service Request message is successful. Otherwise, it is highly probable that the Service Request procedure is unnecessarily/improperly failed due to the timer termination.

[Method for Transmitting MM Reject Message (e.g., Service Reject Message)] (Common to Option 1 and 2)

In the case that the following condition (i.e., Service Reject condition) is satisfied when performing the Service Request procedure, the AMF may transmit the Service Reject message to the UE.

A. The case that there is one PDU session ID included in the Service Request message transmitted in step 1 of the Service Request procedure of FIG. 15 and the UE determines that there is no N11 response message (i.e., fails to receive N11 response message) from the SMF through which the corresponding PDU session ID is transmitted: refer to [method for determining N11 response message reception failure]

B. The case that there are one or more PDU session IDs included in the Service Request message transmitted in step 1 of the Service Request procedure of FIG. 15 (i.e., in the SM request, a plurality of PDU session IDs is associated/involved with a plurality of SMFs), and the response from the SMF that transmitted the N11 message in step 4 is as below:

i. The case of failing to receive the N11 (response) message from all SMFs (i.e., the response from all SMFs is B in the [Configuration of N11 response message]): refer to [method for determining N11 response message reception failure];

ii. The case that the N11 (response) message is received from the SMF, but the reject cause is included in the N11 (response) message from all SMFs (i.e., the case that the response from all SMFs includes A-3) of the [Configuration of N11 response message]); or iii. The case that the response from all SMFs is one of the followings (i.e., the response from all SMFs is B) of the [Configuration of N11 response message]) or includes A-3))

iii-1) Fail to receive the N11 (response) message;

iii-2) The case that the N11 (response) message is received but the reject cause is included in the N11 (response) message from all SMFs The embodiment assumes/premises the case that the AMF accepts the response to the MM Request message (e.g., Service Request message). That is, the embodiment assumes/premises the case that the AMF accepts the request for connection/mobility management in 5GMM aspect.

In the case that the AMF rejects the request according to the Request message, the AMF transmits the Service Reject message regardless of the response of the SMF described above. That is, the AMF may transmit the Service Reject message when rejecting the MM request (e.g., Service Request message), and the AMF may transmit the Service Accept message or the Service Reject message according to the N11 response message transmitted later. The transmission condition of the Service Accept/Reject message may be different depending on option 1 and/or 2 described above.

The Service Reject message may include the information for the N11 response message commonly as below. For example, a response (e.g., Accept/Reject and/or reject cause) from the SMF may be included and transmitted for each PDU session ID/unit that the UE requested in the Service Reject message, and the example is as follows:

In the case that the response (e.g., N11 response message) for the N11 message transmitted to the SMF includes a reject cause, as described in the following example, the AMF transmits the Service response (e.g., Accept or Reject) message with the reject cause: (PDU session ID, reject cause), (PDU session ID, 'reject cause container') or (PDU session ID, 'N1 SM information (SM Reject message (including the reject cause)')

In the case that there is no response (e.g., N11 response message, i.e., failing to receive the N11 response message) for the N11 message transmitted to the SMF, as described in the following example, the AMF transmits the Service response (e.g., Accept or Reject) message with 'no response'. According to an embodiment, 'no response' may be represented/defined as a type/sort of the reject cause: (PDU session ID, 'no response') or (PDU session ID, reject cause='no response')

In the case that the response for the N11 message transmitted to the SMF is success/Accept (e.g., N11 (response) message includes the N1 SM information and/or the N2 SM information), the AMF may include 'Success/Accept (indicator)' in the Service response (e.g., Accept or Reject) message or may not include the response information for the corresponding PDU session ID: (PDU session ID, 'Success/Accept') or 'Null'

[Method for Configuring N1 Message] (Common to Option 1 and 2)

In the case that the UE configures/includes the MM Request message (e.g., Service Request message) and the PDU session ID in the N1 message and transmits it to the AMF, the AMF may transmit the N1 response message (e.g., MM NAS Service Accept/Reject message), which is a response to the N1 message, with all of response/result for all PDU session IDs included in the MM Request message (e.g., the Service Request message transmitted by the UE in step 1 of the Service Request procedure of FIG. 15). The detailed AMF operation for this case may be defined as below. The condition of transmitting Service Accept message, Service Reject message or other N1 message using the N1 response message may follow the embodiment/option (e.g., option 1 or 2 described above) or the combination thereof. Here, in the case that the N1 message including the PDU session ID and the MM message requested by the UE is transmitted to the AMF, a method for the AMF to configure N1 response message therefor is particularly proposed:

The AMF transmits response information with being included in the N1 response message to the UE such that the UE identifies the response information for Accept/Success and Reject/Failure (of PDU session establishment) for the PDU session ID through the N1 message. The AMF determines/regards/decides Accept/Success and Reject/Failure based on/through the N11 response message received from the SMF.

i. The AMF determines/regards/decides as Accept/Success in the case that the N11 response message includes the N1 SM information and/or N2 SM information;

ii. The AMF determines/regards/decides as Reject/Failure in the case that the N11 response message includes Failure/Reject cause or the AMF does not receive any response from the SMF.

The AMF marks the PDU session ID requested by the UE and Accept/Success and Reject/Failure for the PDU session ID in the N1 response message such that the UE may identify it.

i. In the case of Accept/Success, the AMF may mark/signaling/configure Accept/Success in the following method:

i-1) In the case that the N11 response message for the PDU session ID includes the N1 SM information, the N1 response message includes the PDU session ID and the corresponding N1 SM information as a container.

i-2) In the case that the N11 response message for the PDU session ID includes the N2 SM information, the N1 response message includes the PDU session ID and mark/signaling/configuration as 'Accept/Success' which is a result therefor.

ii. Alternatively, in the case of Accept/Success, the AMF may not include a separate mark/signaling in the N1 response message for the PDU session ID that corresponds to Accept/Success. In this case, only the PDU session ID corresponding to Reject may be marked/indicated in the N1 response message. In addition, the N1 SM information may be included in a separate container of the N1 response message (e.g., Service Accept/Reject message), not showing a relation with the PDU session ID, or forwarded to the UE through a separate N1 message which is separated from the N1 response message. The N1 SM information may not be marked/included in the N1 response message. In this case, while the UE identifies that the DRB is established by performing a subsequent operation by the N2 SM information, the UE may identify Accept/Success for the requested PDU session ID. In this embodiment, there is advantage/effect that signaling overhead is reduced, and it is available to configure the Service Accept message efficiently.

iii. In the case of Reject/Failure, the AMF may mark/signal/configure the PDU session ID and the reject cause therefor:

iii-1) In the case that there is no N11 response message including the N1 SM information or the N2 SM information among all N11 response messages, the AMF may regard/determine the Service Request procedure as/to failure, and may transmit the Service response (e.g., Accept or Reject) message with the response/result therefor (e.g., reject cause) to the UE.

In the embodiment, the response/result included in the Service response (e.g., Accept or Reject) message may include all of the failure response/result for the PDU session ID requested by the UE. That is, the failure response/result may be represented/indicated/signaled with the PDU session ID that the UE requested but rejected, and the reject cause therefor.

Detailed invention proposal 1-2) In the case of option 2, a condition of transmitting N1 message, not Service Accept message or Service Reject message In the detailed invention described above, the condition of transmitting the Service Accept message and the Service Reject message is specified.

In this detailed invention, when applying option 2 of the detailed invention 1-1), in the case that a situation other than the condition of transmitting Service Accept/Reject message occurs, a method for the AMF to transmit a response from the SMF to the UE is to be proposed.

In the case that the AMF receives a response to the N11 message from the SMF but a situation other than the condition of transmitting Service Accept/Reject message occurs, the AMF may operate as follows:

The response from the SMF for the N11 message may be transmitted to the UE through different/separate N1 message, not the Service Accept message or the Service Reject message. At this time, the N1 message may be a DL NAS transport message, for example.

When the N1 message is transmitted, a method of including the response from the SMF may follow the detailed invention proposal 1-1) and/or the detailed invention proposal 1-2)

Transmission time of N1 message—In the case that option 2) is applied when the Service Accept message is transmitted, the AMF checks the response from all remaining SMFs except the response from the SMF included in the Service Accept message, and then, transmits the N1 message with the response from the remaining all SMFs being included to the UE.

Invention proposal 2) The proposal is to propose a method/operation for solving problem 2 described above.

In the case that the AMF receives N2 SM information from the SMF (i.e., a plurality of target SMFs is existed, but the AMF receives the N2 SM information from at least one of the SMFs), the AMF may not wait for additional N2 SM information from the SMF, but immediately transmit N2 message (e.g., N2 Request message). Instead, the N2 SM information transmitted by the remaining target SMFs may be transmitted by using divided/separated N2 message (e.g., N2 tunnel setup request message). The AN that receives this may perform the RRC connection reconfiguration procedure, which is step 10 of FIG. 15. At this time, there are following two options in the AN operation that receives the N2 message including the separated N2 SM information.

1) Perform the RRC connection reconfiguration procedure wherever receiving the N2 message 2) Perform the RRC connection reconfiguration after receiving all of the N2 messages In the case of embodiment 1), since the procedure is progressed simultaneously/in parallel by the AN and the AMF, there is an effect that time/delay until the procedure is completed is reduced, and in the case of embodiment 2), there is an effect that signaling overhead is reduced. In the case of operating in embodiment 1) or 2), the AN or UE-RRC may be required to check the time when the RRC connection reconfiguration procedure is completed. For this, the following embodiment is proposed.

When performing step 9 in the Service Request procedure of FIG. 15, in the case that the AMF transmits the N2 message including the N2 SM information received from the SMF, the AMF may operate as below:

After checking responses from all SMF, the AMF transmits an indication indicating that a response is received from all SMFs with being included in the N2 message.

In the case of operating like embodiment 2), the AN may use this indication as an end mark.

In the case of operating embodiment 1), the AN may transmit the indication with being included in an RRC message to UE-AS (e.g., UE-RRC). This indication is forwarded from the UE-AS to the UE-NAS. The UE-AS that receives the corresponding indication may identify that the corresponding procedure is terminated without additional RRC reconfiguration procedure. The UE-NAS may identify that the DRB establishment procedure triggered by the Service Request procedure is terminated. The UE-AS or the UE-NAS identifying that the corresponding procedure is terminated may progress/perform the subsequent procedures required later.

The embodiment for option 2) of the detailed invention proposal 1-1) and the detailed invention proposal 1-2) described above are as follows.

Assumption/Premise)

In the Service Request procedure of FIG. 15, the UE requests three PDU session IDs (i.e., three PDU session IDs are included in the 'Service Request/N1' message transmitted in step 1), and all of the target SMFs for each PDU session ID are different. At this time, the AMF transmits the N11 message to each target SMF in step 4 and waits for a response.

In this embodiment, 'response from SMF' means all kinds of responses that may be received from SMF (e.g., as an example of the response types, detailed invention proposal 1-2) embodiment may be applied.).

In the case that the AMF transmits the N11 message to the SMF, at least one PDU session ID may be included in the N11 message. In response to this, when transmitting the N11 (response) message, the SMF may transmit the N11 (response) message with a response to the respective requested PDU session ID to the AMF. At this time, the AMF may operate differently for each response to the PDU session ID. For example, in the case that a reject cause for PDU session ID1 is included and the N1 SM information and the N2 SM information for PDU session ID2 is included in the N11 (response) message transmitted by the same SMF, the AMF may transmit a Service Accept message. In case 1) and case 2) below, it assumed different target SMF for each PDU session ID, but in the case of applying scenario in accordance with this, the same SMF may exist among SMF1, SMF2 and SMF3, and this may be applied in the form that these are distinguished with different PDU session ID. For example, in the case that SMF1 and SMF2 are the same SMF in the following case, SMF1 and SMF2 may be substituted/distinguished by PDU session ID1 and PDU session ID2.

Case 1) The response order for the N11 message transmitted by the AMF from the SMF may be as follows:

Step 1. N11 response message of SMF1 includes N1 SM information or N2 SM information.

Step 2. Response of SMF2

Step 3. Response of SMF3

In this case, the AMF,

Transmit a Service Accept message in step 1. In the case that the N1 SM information is included in the N11 response message received in step 1, the AMF includes the N1 SM information in the Service Accept message. In the case that the N1 SM information is included in the response of step 2 and step 3, the corresponding N1 SM information is transmitted to the UE by being included in a separate N1 message (e.g., NAS transport message) in a container form.

When up to step 3 is completed, the AMF may determine that responses from all SMFs are checked, and transmit the responses (e.g., SMF2 response in step 2 and SMF3 response in step 3) from the SMF, not included in the Service Accept message, with being included in a separate N1 message (e.g., NAS transport message). In the case that the N1 SM information is included in the N11 response message received by the AMF, the AMF may transmit it with being included in an N1 message (e.g., NAS transport message).

Case 2) The response order for the N11 message transmitted by the AMF from the SMF may be as follows:

Step 1. N11 response message of SMF1 includes a reject cause.

Step 2. N11 response message of SMF2 includes N1 SM information or N2 SM information.

Step 3. Response of SMF3

In this case, the AMF:

In step 1, the AMF waits for a response from the next SMF.

In step 2, the AMF transmits a Service Accept message. In the case that the N1 SM information is included in the N11 response message received in step 2, the AMF includes the N1 SM information in the Service Accept message.

In step 3, the AMF may determine that responses from all SMFs are checked, and transmit the responses (e.g., responses from SMF1 and SMF3 received in step 1 and step 3) from the SMF, not included in the Service Accept message, with being included in a separate N1 message (e.g., DL NAS transport message).

Case 3) In the case below, the AMF may transmit a Service Reject/Accept message.

Step 1. N11 response message of SMF1 includes a reject cause.

Step 2. N11 response message of SMF2 includes a reject cause.

Step 3. N11 response message of SMF3 includes a reject cause or N11 response message reception failure.

In this case, the AMF:

In step 1, the AMF waits for a response from the next SMF.

In step 2, the AMF waits for a response from the next SMF.

In step 3, the AMF determines that responses from all SMFs are checked, and transmits the responses received from all SMFs with being included in the Service Accept/Reject message to the UE.

Figure 20:
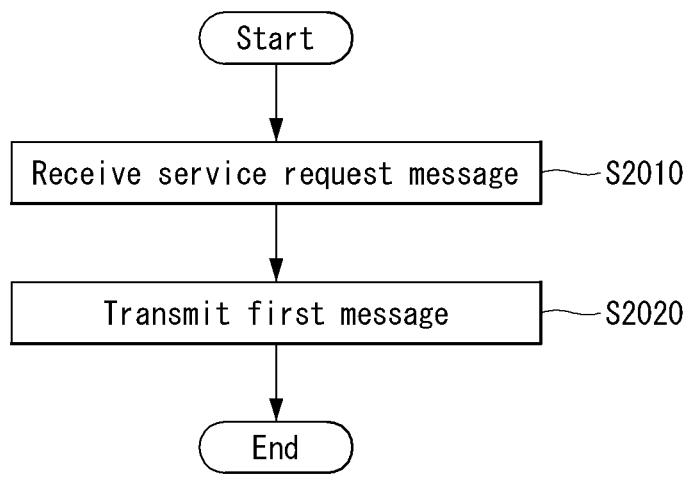
FIG. 20 is a flowchart illustrating a method for performing a service request procedure of an AMF according to an embodiment of the present invention.

FIG. 20 is a flowchart illustrating a method for performing a service request procedure of an AMF according to an embodiment of the present invention. In relation to this flowchart, the embodiments described above may be identically/similarly applied, and the repeated description is omitted. In addition, in this flowchart, at least one step may be deleted or a new step may be added.

First, an AMF may receive a service request message including a PDU session ID for a PDU session whose activation is desired by a UE from the UE.

Next, the AMF may transmit a first message (e.g., N11 message) including the PDU session ID to a SMF.

At this time, when an establishment of the PDU session is rejected by the SMF, the AMF may receive a second message (e.g., N11 response message) including a reject cause of the PDU session establishment as a response to the first message. In this case, the AMF may transmit a service response message including the reject cause and a PDU session ID rejected by the reject cause to the UE.

On the contrary, when the establishment of the PDU session is accepted by the SMF, the AMF may receive a third message (e.g., N11 response message) including N2 SM information including information to be provided from the AMF to an AN as a response to the first message. In this case, the AMF may transmit the N2 SM information to the AN. More particularly, when a plurality of PDU session IDs involving a plurality of SMFs is included in the service request message, the AMF may transmit N2 SM information received from at least some of the plurality of SMFs to the AN through an N2 request message without waiting for a reception of N2 SM information from all of the plurality of SMFs. Further, when the additional N2 SM information is received from remaining SMFs except the at least some of the plurality of SMFs, the AMF may transmit the additional N2 SM information to the AN through a separate N2 message. At this time, the separate N2 message may correspond to an N2 tunnel setup request message. The AN that receives the N2 SM information may perform an RRC connection reconfiguration for the UE based on the received N2 SM information.

Different from this, when the plurality of PDU session IDs involving the plurality of SMFs is included in the service request message, the service response message may be transmitted after the second message and/or the third message is received from all of the plurality of SMFs. In this case, the service response message may be configured/generated so as to include an accept result of a PDU session establishment for all of the plurality of PDU session IDs. In addition, the service response message may correspond to a service accept message. That is, the service response message may be transmitted to the UE as the service accept message always regardless of the accept result for the PDU session.

Apparatus to which the Present Invention May be Applied

Figure 21:
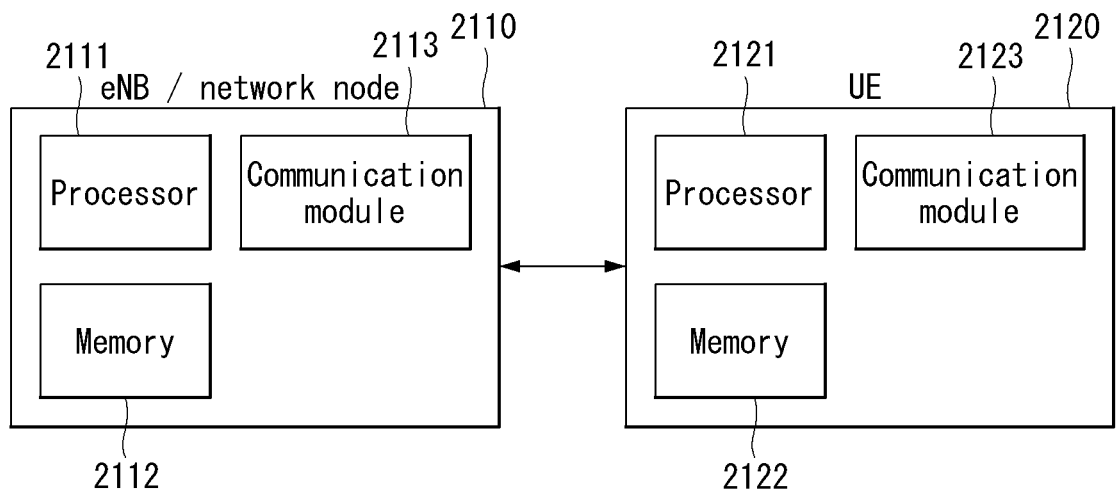
FIG. 21 illustrates a block diagram of a communication apparatus according to an embodiment of the present invention.

FIG. 21 illustrates a block diagram of a communication apparatus according to an embodiment of the present invention.

Referring to FIG. 21, a wireless communication system includes a network node 2110 and a plurality of UEs (UE) 2120.

The network node 2110 includes a processor 2111, a memory 2112, and a communication module 2113. The processor 2111 implements the previously proposed functions, processes and/or methods. The layers of the wired/wireless interface protocol may be implemented by the processor 2111. The memory 2112 is connected to the processor 2111 and stores various information for driving the processor 2111. The communication module 2113 is connected to the processor 2111 to transmit and/or receive a wired/wireless signal. Some examples of the network node 2110 may include a base station, an MME, an HSS, an SGW, a PGW, and an application server. In particular, when the network node 2110 is a base station, the communication module 2113 may include a radio frequency unit for transmitting/receiving a radio signal.

The UE 2120 includes a processor 2121, a memory 2122 and a communication module (or RF section). Processor 2121 implements the previously proposed functions, processes and/or methods. The layers of the wireless interface protocol may be implemented by the processor 2121. The memory 2122 is connected to the processor 2121 and stores various information for driving the processor 2121. The communication module 2123 is coupled to processor 2121 to transmit and/or receive wireless signals.

The memories 2112 and 2122 may be located inside or outside the processors 2111 and 2121 and may be coupled to the processors 2111 and 2121 by various well known means. Also, the network node 2110 (in the case of a base station) and/or the UE 2120 may have a single antenna or multiple antennas.

Figure 22:
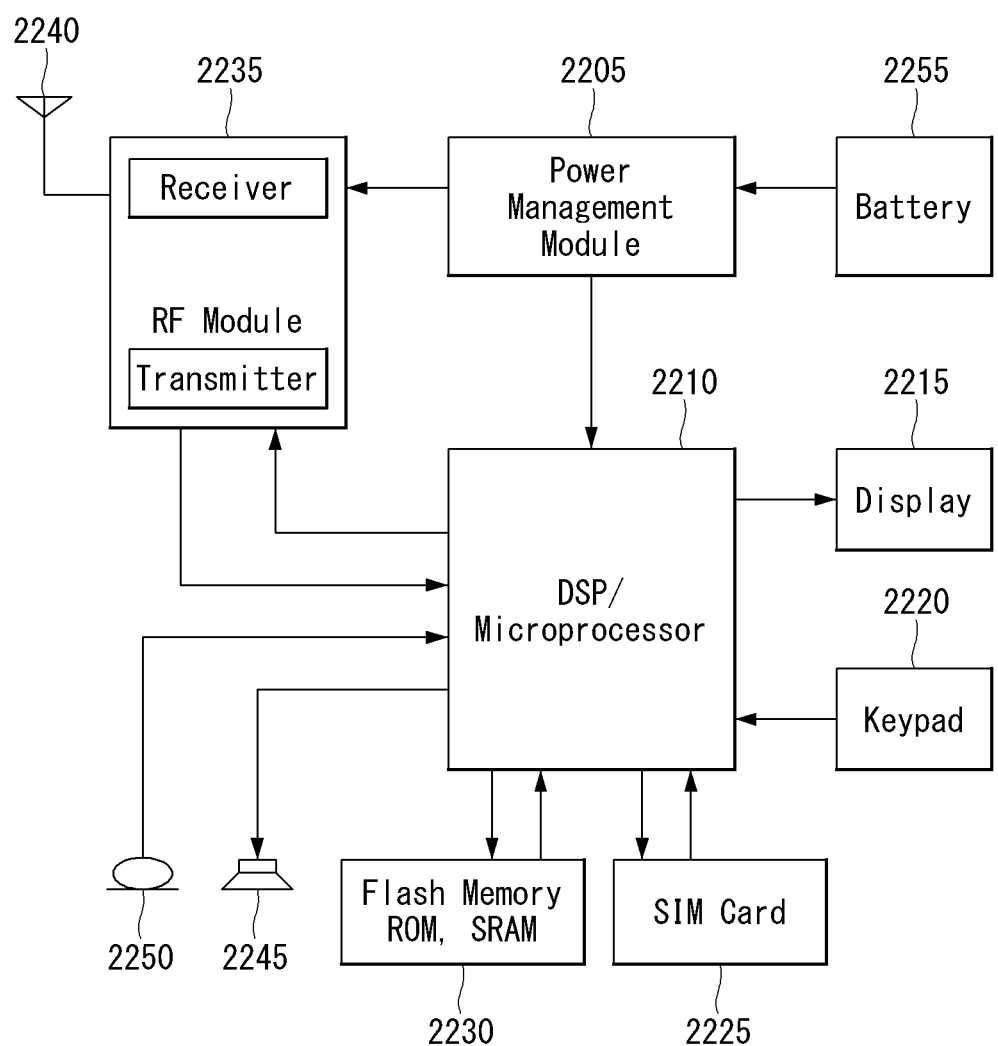
FIG. 22 shows a block diagram of a communication apparatus according to an embodiment of the present invention.

FIG. 22 shows a block diagram of a communication apparatus according to an embodiment of the present invention.

Specifically, FIG. 22 is a more detailed diagram of the UE of FIG. 21.

Referring to FIG. 22, the UE may include a processor (or digital signal processor (DSP)) 2210, an RF module (or RF unit) 2235, a power management module 2205, an antenna 2240, a battery 2255, a display 2215, a keypad 2220, memory 2230, a subscriber identification module (SIM) card 2225 (this element is optional), a speaker 2245 and a microphone 2250. The UE may also include a single antenna or multiple antennas.

The processor 2210 implements the functions, processes and/or methods proposed above. The layers of a radio interface protocol may be implemented by the processor 2210.

The memory 2230 is connected to the processor 2210 and stores information related to the operation of the processor 2210. The memory 2230 may be located inside or outside the processor 2210 and may be connected to the processor 2210 by well-known various means.

A user inputs command information, such as a telephone number, by pressing (or touching) a button of the keypad 2220 or by voice activation using the microphone 2250, for example. The processor 2210 processes a proper function, such as receiving such command information or making a call to a telephone number, so that the function is performed. Operational data may be extracted from the SIM card 2225 or the memory 2230. Furthermore, the processor 2210 may display command information or driving information on the display 2215 so that a user can recognize the information or for convenience.

The RF module 2235 is connected to the processor 2210 and transmits and/or receives RF signals. The processor 2210 transfers command information to the RF module 2235 so that a radio signal forming voice communication data, for example, is transmitted in order to initiate communication. The RF module 2235 includes a receiver and a transmitter in order to transmit and receive radio signals. The antenna 2240 functions to transmit and receive radio signals. When the RF module 2235 receives a radio signal, it transfers the signal for the processing of the processor 2210 and may convert the signal into a baseband. The processed signal may be converted into audible or readable information through the speaker 2245.

According to an embodiment of the present invention, a service request procedure is more clearly defined, and accordingly, various problems that may occur according to ambiguity.

In addition, according to an embodiment of the present invention, an accept/reject for a PDU session establishment and/or a reject cause is clearly instructed to an AMF, and accordingly, there is an effect that procedural ambiguity and operational ambiguity of the AMF may be settled.

The Effects which may be obtained by the present invention are not limited to the aforementioned effects, and other technical effects not described above may be evidently understood by a person having ordinary skill in the art to which the present invention pertains from the following description.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

In this specification, 'A and/or B' can be interpreted to mean 'at least one of A and (or) B.'

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

The present invention, applied to 3GPP LTE/LTE-A/NR (5G) system, is primarily described as an example, but may be applied to various wireless communication systems in addition to the 3GPP LTE/LTE-A/NR (5G) system.

What is claimed is:

1. A method of performing, by an access and mobility management function (AMF), a service request procedure in a wireless communication system, the method comprising:
   receiving, from an access network (AN), a request message for requesting a service to be used by a user equipment (UE);
   transmitting, to a session management function (SMF), a first message comprising a PDU session ID associated with the service that is requested in the request message; and
   based on the SMF rejecting establishment of a User Plane of a PDU session for the service that is requested in the request message:

receiving, from the SMF in response to the first message, a second message comprising a cause for the SMF rejecting the establishment of the User Plane of the PDU session; and transmitting, to the UE, a response message for responding to the request message, wherein the response message includes a status of the PDU session in the AMF, wherein the status of the PDU session indicates to the UE the status of the PDU session related with the PDU session ID, wherein the response message is transmitted after receiving the second message from all SMFs, based on multiple PDU sessions that involves multiple SMFs.

2. The method of claim 1, further comprising:
based on the SMF accepting the establishment of the User Plane of the PDU session for the service that is requested in the request message:
receiving a third message comprising N2 session management (N2 SM) information that comprises information to be provided from the AMF to the AN based on the first message; and
transmitting, to the AN, the N2 SM information.

3. The method of claim 2, wherein transmitting the N2 SM information to the AN comprises:
based on the multiple PDU sessions that involve the multiple SMFs, associated with the service that is requested in the request message:
transmitting, to the AN through an N2 request message, the N2 SM information that is received from at least some of the multiple SMFs without waiting for reception of the N2 SM information from all SMFs.

4. The method of claim 3, wherein transmitting the N2 SM information to the AN comprises:
transmitting additional N2 SM information to the AN through a separate N2 message based on the additional N2 SM information being received from remaining SMFs except the at least some of the multiple SMFs.

5. The method of claim 4, wherein the separate N2 message corresponds to an N2 tunnel setup request message.

6. The method of claim 4, wherein the AN comprises a network node performing a radio resource control (RRC) connection reconfiguration for the UE based on the N2 SM information.

7. The method of claim 3, wherein the response message comprises an accept result of a PDU session establishment for all PDU session IDs.

8. The method of claim 3, wherein the response message corresponds to a service accept message.

9. An access and mobility management function (AMF) configured to perform a service request procedure in a wireless communication system, the AMF comprising:
a communication module;
at least one processor; and
at least one computer memory operably connectable to the at least one processor and storing instructions that, when executed by the at least one processor, perform operations comprising:

receiving, via the communication module from an access network (AN), a request message for requesting a service to be used by a user equipment (UE);

transmitting, via the communication module to a session management function (SMF), a first message comprising a PDU session ID associated with the service that is requested in the request message; and based on the SMF rejecting establishment of a User Plane of a PDU session for the service that is requested in the request message:
receiving, via the communication module from the SMF, a second message comprising a cause for the SMF rejecting the establishment of the User Plane of the PDU session; and transmitting, via the communication module to the UE, a response message for responding to the request message, wherein the response message includes a status of the PDU session in the AMF, wherein the status of the PDU session indicates to the UE the status of the PDU session related with the PDU session ID, wherein the response message is transmitted after receiving the second message from all SMFs, based on multiple PDU sessions that involve multiple SMFs.

10. The AMF of claim 9, wherein the operations further comprise:
based on the SMF accepting the establishment of the User Plane of the PDU session for the service that is requested in the request message:
receiving, via the communication module, a third message comprising N2 session management (N2 SM) information that comprises information to be provided from the AMF to the AN based on the first message, and
transmitting, via the communication module to the AN, the N2 SM information.

11. The AMF of claim 10, wherein transmitting the N2 SM information to the AN comprises:
based on the multiple PDU sessions that involve the multiple SMFs, associated with the service that is requested in the request message:
transmitting, via the communication module to the AN through an N2 request message, the N2 SM information that is received from at least some of the multiple SMFs without waiting for reception of the N2 SM information from all SMFs.

12. The AMF of claim 11, wherein transmitting the N2 SM information to the AN comprises:
transmitting additional N2 SM information to the AN through a separate N2 message based on the additional N2 SM information being received from remaining SMFs except the at least some of the multiple SMFs.

13. The AMF of claim 12, wherein the separate N2 message corresponds to an N2 tunnel setup request message.

14. The AMF of claim 12, wherein the AN comprises a network node performing a radio resource control (RRC) connection reconfiguration for the UE based on the N2 SM information.

* * * * *